(12) United States Patent
Shigematsu

(10) Patent No.: US 11,831,967 B2
(45) Date of Patent: Nov. 28, 2023

(54) VIEWFINDER UNIT WITH LINE-OF-SIGHT DETECTION FUNCTION, IMAGE CAPTURING APPARATUS, AND ATTACHMENT ACCESSORY

(71) Applicant: CANON KABUSHIKI KAISHA, Tokyo (JP)

(72) Inventor: Masayasu Shigematsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/589,033

(22) Filed: Jan. 31, 2022

(65) Prior Publication Data
US 2022/0247904 A1  Aug. 4, 2022

(30) Foreign Application Priority Data

Feb. 4, 2021 (JP) .................................. 2021-016296
Jun. 28, 2021 (JP) .................................. 2021-106529

(51) Int. Cl.
*G02B 27/00* (2006.01)
*H04N 23/53* (2023.01)
(Continued)

(52) U.S. Cl.
CPC ............. *H04N 23/53* (2023.01); *G02B 7/021* (2013.01); *G02B 25/001* (2013.01);
(Continued)

(58) Field of Classification Search
CPC ........ H04N 23/53; H04N 23/56; H04N 23/57; H04N 23/55; H04N 23/611; H04N 23/63; H04N 23/667; H04N 23/67; H04N 23/69; G02B 7/021; G02B 25/001; G02B 27/0093; G06F 3/013; G03B 13/16; G03B 30/00; G03B 2213/025
See application file for complete search history.

(56) References Cited

U.S. PATENT DOCUMENTS 7,884,977 B2 * 2/2011 Mori ....................... H04N 19/12
  358/538
8,086,044 B2 * 12/2011 Feng .................... H04N 19/176
  382/220

(Continued)

FOREIGN PATENT DOCUMENTS

JP          H05333259 A      12/1993

*Primary Examiner* — Frank F Huang
(74) *Attorney, Agent, or Firm* — Canon U.S.A., Inc. I.P. Division

(57) ABSTRACT

A viewfinder unit includes an optical member between a display and an eyepiece, a first member holding the optical member in a direction orthogonal to an optical axis of the optical member, an illumination device, a second member holding the illumination device, a sensor capable of picking up a photographer's eye image, and an opening wider than a display area of the display in an optical axis direction of the optical member. When the eyepiece is viewed in the optical axis direction, the illumination device is inside the opening and outside the display area. Part of a first area of the optical member, projecting from an outline of the first member in the optical axis direction, is inside the opening in the orthogonal direction, and at least one of the illumination device and the second member is in a second area surrounded by the outline and the first area.

30 Claims, 20 Drawing Sheets

(51) Int. Cl.
*G06F 3/01* (2006.01)
*G02B 25/00* (2006.01)
*G02B 7/02* (2021.01)
*H04N 23/56* (2023.01)

(52) U.S. Cl.
CPC ......... *G02B 27/0093* (2013.01); *G06F 3/013* (2013.01); *H04N 23/56* (2023.01)

(56) References Cited

U.S. PATENT DOCUMENTS

| | | | | |
|---|---|---|---|---|
| 8,878,773 | B1* | 11/2014 | Bozarth | G06V 10/143 382/103 |
| 9,274,597 | B1* | 3/2016 | Karakotsios | G06F 3/0346 |
| 9,557,568 | B1* | 1/2017 | Ouderkirk | G02B 27/0081 |
| 10,217,286 | B1* | 2/2019 | Angel | G06F 3/013 |
| 10,466,484 | B1* | 11/2019 | Yoon | H04N 13/332 |
| 10,466,779 | B1* | 11/2019 | Liu | G02B 27/017 |
| 10,502,963 | B1* | 12/2019 | Noble | B29D 11/0073 |
| 10,885,843 | B1* | 1/2021 | Lu | G09G 3/3266 |
| 11,120,728 | B2* | 9/2021 | Nagasaki | G09G 3/2003 |
| 11,176,367 | B1* | 11/2021 | Fix | G06T 7/521 |
| 11,393,430 | B2* | 7/2022 | Nagasaki | G09G 3/32 |
| 2008/0143820 | A1* | 6/2008 | Peterson | G06T 11/60 348/E7.001 |
| 2008/0212942 | A1* | 9/2008 | Gordon | H04N 21/4334 348/E7.071 |
| 2008/0309649 | A1* | 12/2008 | Kojima | G09G 3/3283 327/108 |
| 2009/0196460 | A1* | 8/2009 | Jakobs | G06V 40/19 382/103 |
| 2011/0234750 | A1* | 9/2011 | Lai | G03B 37/04 348/E7.001 |
| 2012/0249957 | A1* | 10/2012 | Shibata | A61B 3/0025 351/206 |
| 2012/0250980 | A1* | 10/2012 | Gillard | H04N 19/46 382/173 |
| 2012/0254369 | A1* | 10/2012 | Gillard | H04N 21/4756 709/219 |
| 2012/0257005 | A1* | 10/2012 | Browne | G02B 27/017 348/E7.001 |
| 2013/0099700 | A1* | 4/2013 | Kreye | H05B 47/10 315/320 |
| 2013/0182066 | A1* | 7/2013 | Ishimoto | E02F 9/261 348/38 |
| 2014/0037213 | A1* | 2/2014 | Niederberger | G06T 11/00 382/195 |
| 2014/0049452 | A1* | 2/2014 | Maltz | G02B 27/017 345/8 |
| 2015/0243718 | A1* | 8/2015 | Kwon | H10K 59/131 257/43 |
| 2016/0029883 | A1* | 2/2016 | Cox | G06V 40/19 351/209 |
| 2016/0085300 | A1* | 3/2016 | Robbins | G02B 27/0172 345/633 |
| 2016/0241892 | A1* | 8/2016 | Cole | G06T 15/04 |
| 2016/0342205 | A1* | 11/2016 | Shigeta | G06V 10/147 |
| 2018/0046859 | A1* | 2/2018 | Jarvenpaa | H04N 23/56 |
| 2018/0275409 | A1* | 9/2018 | Gao | G06T 19/006 |
| 2018/0307048 | A1* | 10/2018 | Alexander | G03H 1/26 |
| 2019/0086674 | A1* | 3/2019 | Sinay | G02B 27/283 |
| 2020/0143741 | A1* | 5/2020 | Tsuboi | G09G 3/3233 |
| 2020/0183174 | A1* | 6/2020 | Noui | G02B 27/0172 |
| 2020/0336645 | A1* | 10/2020 | Fukuda | H04N 1/00251 |
| 2020/0368616 | A1* | 11/2020 | Delamont | G06F 3/011 |
| 2020/0412965 | A1* | 12/2020 | Yoshida | H04N 23/672 |
| 2021/0011284 | A1* | 1/2021 | Andreev | G02B 27/0025 |
| 2021/0041948 | A1* | 2/2021 | Berkner-Cieslicki | G06F 3/011 |
| 2022/0197376 | A1* | 6/2022 | Boyle | G06F 3/013 |
| 2022/0382064 | A1* | 12/2022 | Rohn | G02B 1/002 |
| 2022/0394234 | A1* | 12/2022 | Etigson | G02B 30/10 |
| 2022/0397956 | A1* | 12/2022 | Lundell | G06F 3/013 |
| 2022/0413302 | A1* | 12/2022 | Meitav | G02B 27/0093 |
| 2022/0413603 | A1* | 12/2022 | Held | G02B 27/0093 |

* cited by examiner

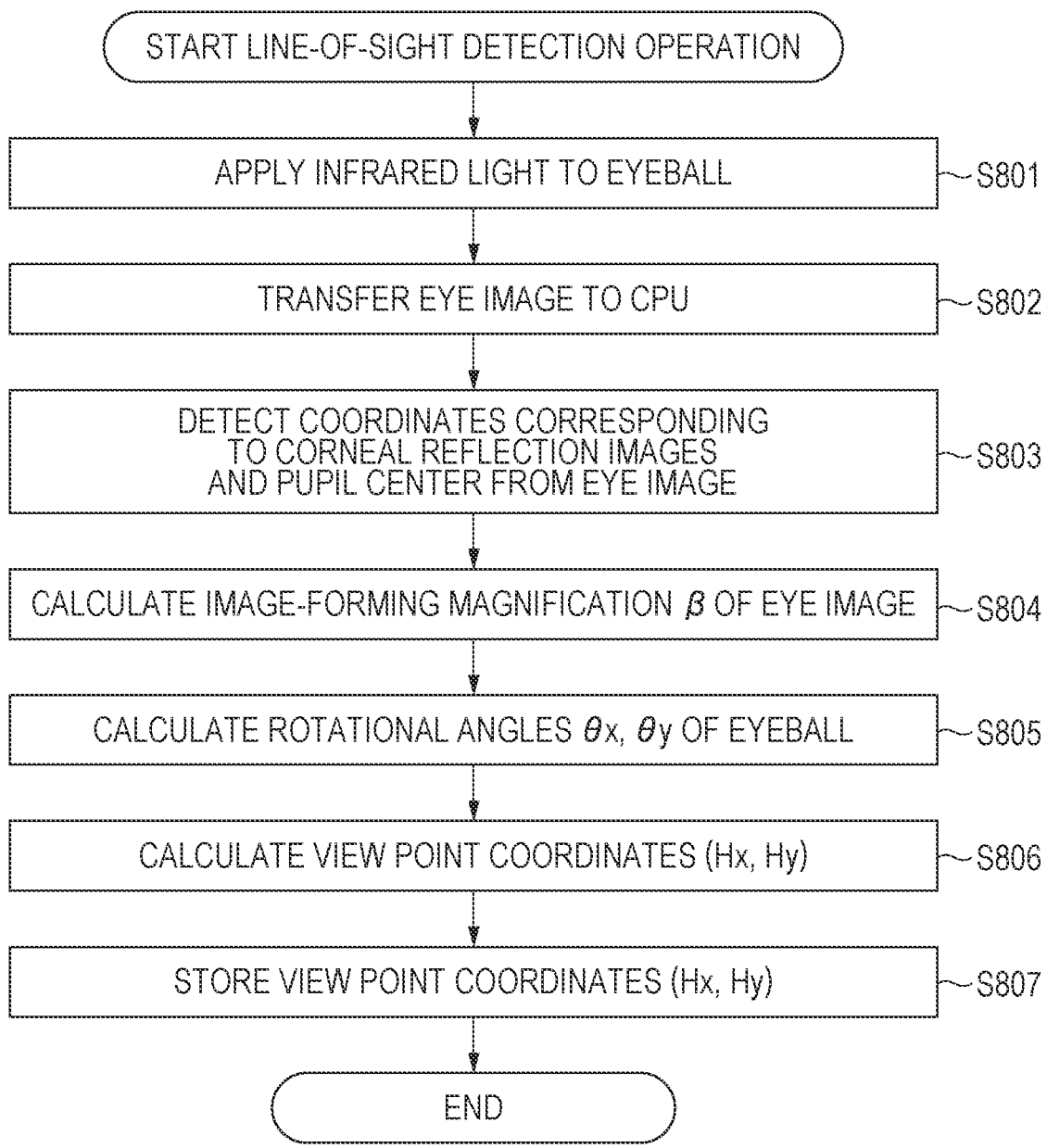

VIEWFINDER UNIT WITH LINE-OF-SIGHT DETECTION FUNCTION, IMAGE CAPTURING APPARATUS, AND ATTACHMENT ACCESSORY

BACKGROUND

Field

The present disclosure relates to a viewfinder unit with a line-of-sight detection function, an image capturing apparatus with the viewfinder unit, and an attachment accessory detachably attachable to the viewfinder unit.

Description of the Related Art

Among cameras and the like, cameras with a line-of-sight detection function, which implement a function to, for example, select a distance measuring point by detecting the line-of-sight direction of a user, as described in Japanese Patent Laid-Open No. 5-333259 have been practically used. A camera with such a line-of-sight detection function includes a plurality of infrared LEDs outside a viewfinder opening of an eyepiece portion and uses the infrared LEDs to illuminate an eyeball of a user who looks into the viewfinder. Thus, the camera is configured to detect a user's eyeball image and corneal reflection images of the infrared LEDs, formed by specular reflection from a cornea, with a line-of-sight sensor and to obtain a position where the user is looking by performing computations on the two types of images. In Japanese Patent Laid-Open No. 5-333259, the infrared LEDs are placed outside the viewfinder opening when the viewfinder is viewed from the side on the viewfinder opening. In Japanese Patent Laid-Open No. 5-333259, in order to prevent the infrared LEDs from being visually recognized by a photographer, a window that transmits only infrared light is provided. With this configuration, the infrared LEDs project toward the optical axis direction of the viewfinder beyond a lens closest to the photographer among the eyepiece lens group of the viewfinder, or a cover window.

SUMMARY

According to an aspect of the present disclosure, a viewfinder unit includes a display unit capable of displaying an image, an eyepiece portion, an optical member provided between the display unit and the eyepiece portion, a first holding member configured to hold the optical member in a direction orthogonal to an optical axis of the optical member, an illumination device configured to illuminate an eye of a photographer with predetermined light, a second holding member configured to hold the illumination device, a sensor capable of picking up an image of the eye of the photographer, illuminated by the illumination device with the predetermined light, to detect a line of sight of the photographer, and an opening provided in the eyepiece portion, wherein the opening is wider than a display area of the display unit when viewed in an optical axis direction of the optical member, wherein, when the eyepiece portion is viewed in the optical axis direction, the illumination device is located inside the opening and outside the display area of the display unit, wherein part of a first area of the optical member, projecting from an outline of the first holding member in the optical axis direction, is located inside the opening in the direction orthogonal to the optical axis, and wherein at least one of the illumination device and the second holding member is located in a second area where the second area is surrounded by the outline of the first holding member and the first area of the optical member.

Further features of the present disclosure will become apparent from the following description of exemplary embodiments with reference to the attached drawings.

BRIEF DESCRIPTION OF THE DRAWINGS

FIG. 12 is a flowchart of a line-of-sight detection operation according to the embodiment.

DESCRIPTION OF THE EMBODIMENTS

Figure 1A:
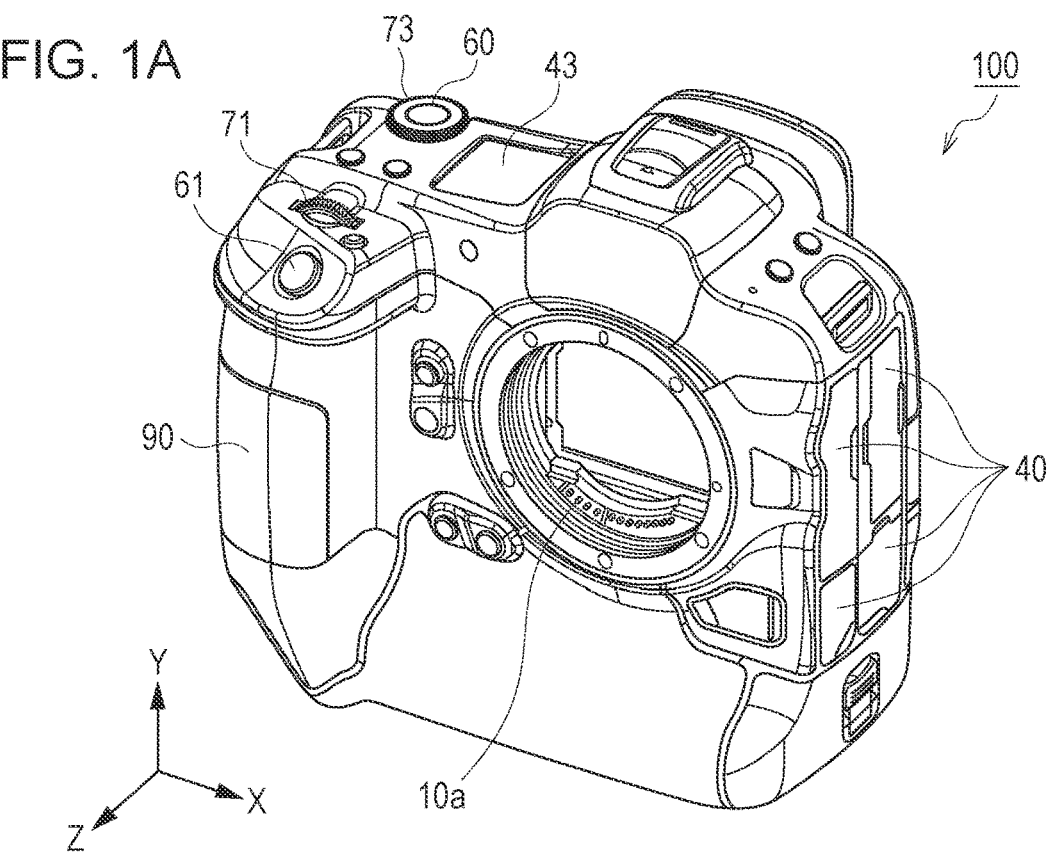
FIGS. 1A and 1B are outer appearance views of a digital camera according to an embodiment of the present disclosure.

Hereinafter, exemplary embodiments of the present disclosure will be described with reference to the attached drawings. Like reference signs denote the identical members or elements in the drawings, and the repeated description is omitted or simplified.

An optical apparatus in the present embodiment includes a device that displays information such as images and text, and any optical apparatus capable of detecting the line of sight of a user who watches display information of the device.

The optical apparatus with an eyepiece portion to which an eyecup 802 or the like is detachably attachable according to the present embodiment may be, for example, a camera, a monocular, a binocular, a range finder, a cellular phone, a game machine, a tablet terminal, a personal computer, a head mounted display, or the like. An attachment unit detachably attachable to the eyepiece portion may be, for example, a rain cover, a magnifier, an angle finder, or the like, other than an eyecup.

Figure 1B:
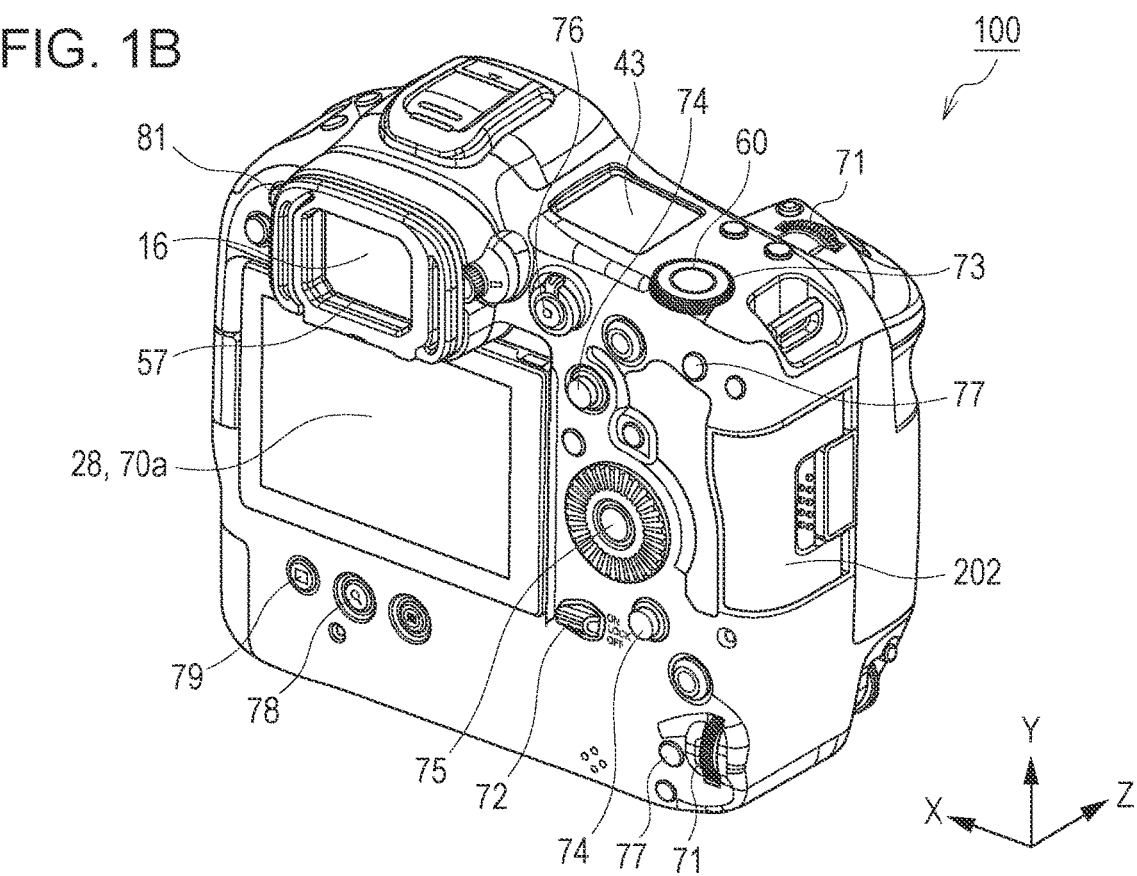

FIGS. 1A and 1B are outer appearance views of a digital camera 100 according to the embodiment. FIG. 1A is a front perspective view of the digital camera 100. FIG. 1B is a back perspective view of the digital camera 100. The digital camera 100 is an example of the optical apparatus as described above.

In FIGS. 1A and 1B, a display unit 28 is a display unit provided on a camera back side and used to display images and various pieces of information. A touch panel 70a is capable of detecting a touch operation on the display surface (operation surface) of the display unit 28. An external viewfinder display unit 43 is a display unit provided on the upper surface of the camera. The external viewfinder display unit 43 displays various setting values of the camera, including a shutter speed and an aperture.

A shutter button 61 is an operation unit for providing an image shooting instruction. A mode select switch 60 is an operation unit for switching among various modes. Terminal covers 40 are covers that protect connectors (not shown) for connecting an external device and the digital camera 100 with a connection cable. Two main electronic dials 71 are rotary operation members included in an operation unit 70 of FIG. 2. Setting values of shutter speed, aperture, and the like can be, for example, changed by turning the main electronic dials 71.

A power switch 72 is an operation member to switch the power of the digital camera 100 between on and off. A sub-electronic dial 73 is a rotary operation member included in the operation unit 70. Movement of a selection frame, image feeding, and the like can be performed with the sub-electronic dial 73. A multi-direction key 74 is included in the operation unit 70 and is a multi-direction key (eight-direction key) able to be operated in eight directions, that is, upper, lower, right, left, upper right diagonal, lower right diagonal, lower left diagonal, and upper left diagonal.

A SET button 75 is a push button included in the operation unit 70 and is mainly used to, for example, determine a selected item. A video button 76 is used to provide an instruction to start or stop video shooting (recording).

An AE lock button 77 is included in the operation unit 70 and is able to fix an exposure when pressed in a shooting standby state. A zoom button 78 is included in the operation unit 70 and is an operation button for turning on or off a zoom mode in live view display of a shooting mode.

A live view (LV) image is able to be zoomed in and out by turning on the zoom mode and then operating one of the two main electronic dials 71. In a playback mode, the zoom button 78 functions as a zoom button for magnifying a playback image and increasing a magnification. The playback button 79 is included in the operation unit 70 and is an operation button to switch between the shooting mode and the playback mode.

When the playback button 79 is pressed in the shooting mode, the mode shifts to the playback mode, and the latest image among images recorded in a recording medium 200 can be displayed on the display unit 28. A menu button 81 is included in the operation unit 70. When the menu button 81 is pressed, a menu screen that provides various settings is displayed on the display unit 28.

A user is able to intuitively make various settings with the menu screen displayed on the display unit 28, the multi-direction key 74, and the SET button 75. A camera-side communication terminal 10a provided at a lens mount part is a communication terminal for communicating with an interchangeable lens side. The camera-side communication terminal 10a contacts with an interchangeable lens-side communication terminal 6 by attaching an interchangeable lens (lens unit 150) to the lens mount part of the digital camera 100.

An eyepiece portion 16 is an eyepiece portion of an eyepiece viewfinder (look-in viewfinder). A user is able to visually recognize video displayed on an internal electric view finder (EVF) module 29 via the eyepiece portion 16. In the present embodiment, the eyepiece portion 16 includes an eyepiece cover 800 and an eyepiece frame 801 (described later); however, the configuration of the eyepiece portion 16 is not limited thereto. When, for example, the eyecup 802 (described later) is not configured to be detachable and is fixed to a viewfinder unit 900 (described later), the eyepiece portion 16 may be regarded as including the eyecup 802.

An eyepiece detection unit 57 is an eyepiece sensor that detects whether a user's eye is in contact with the eyepiece portion 16. The eyepiece detection unit 57 is placed inside a recess 702k of an infrared LED holder 702 (described later). In the present embodiment, a series of units including the eyepiece portion 16, the EVF module 29, and the eyepiece detection unit 57 is referred to as the viewfinder unit (viewfinder apparatus) 900. The details of each of the portions that make up the viewfinder unit 900 will be described later.

A lid 202 is a lid of a slot in which the recording medium 200 is stored. A grip portion 90 is a holding portion formed in a shape such that a user is able to easily grip the grip portion 90 with his or her right hand at the time of holding the digital camera 100. The shutter button 61 and one of the main electronic dials 71 are placed in positions where a user is able to operate the shutter button 61 and the main electronic dial 71 with the index finger of the right hand in a state where the user holds the digital camera 100 by gripping the grip portion 90 with the little finger, ring finger, and middle finger of the right hand. In the same state, the multi-direction key 74 and the sub-electronic dial 73 are placed in positions where the user is able to operate with the thumb of the right hand.

Figure 2:
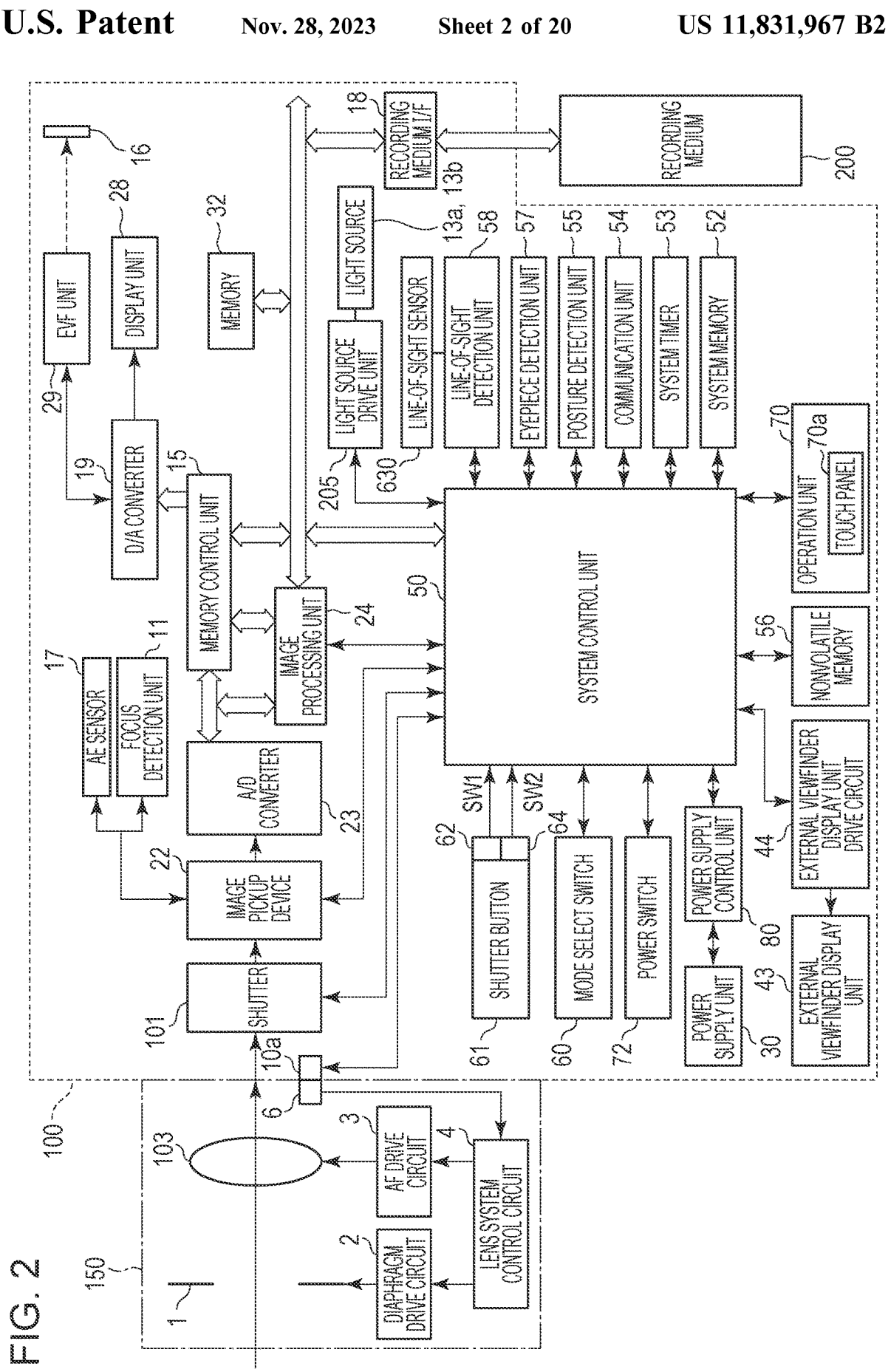
FIG. 2 is a schematic block diagram showing an example of the hardware configuration of the digital camera according to the embodiment of the present disclosure.

FIG. 2 is a schematic block diagram showing the hardware configuration of the digital camera 100 according to the present embodiment.

In FIG. 2, reference numeral 150 indicates an interchangeable lens unit in which a taking lens and the like are mounted.

A lens 103 is usually made up of a plurality of lenses. Here, it is simplified, and only one lens is shown. The lens-side communication terminal 6 is a communication terminal for the lens unit 150 to communicate with the digital camera 100.

A lens system control circuit 4 in the lens unit 150 communicates with a digital camera-side system control unit 50 via the lens-side communication terminal 6 and the camera-side communication terminal 10a. The lens system control circuit 4 controls a diaphragm 1 via a diaphragm drive circuit 2 and focuses by displacing the position of the lens 103 in an optical axis direction via an AF drive circuit 3.

An AE sensor 17 meters the luminance of a subject through the lens unit 150. A focus detection unit 11 is configured as a dedicated phase difference sensor or an imaging plane phase difference sensor of the image pickup device 22 and outputs defocus amount information to the system control unit 50. The system control unit 50 controls the lens unit 150 in accordance with the defocus amount information to perform phase difference AF.

A shutter 101 is, for example, a focal plane shutter for controlling the exposure time of the image pickup device 22 under control of the system control unit 50. The image pickup device 22 is made up of a CCD, CMOS, or the like that converts an optical image to an electrical signal. An A/D converter 23 converts an analog signal output from the image pickup device 22 to a digital signal.

An image processing unit 24 executes predetermined pixel interpolation, resizing processing, such as reduction, and color conversion processing on data from the A/D converter 23 or data from a memory control unit 15. The image processing unit 24 executes predetermined calculation processing by using the picked-up image data, and the system control unit 50 executes exposure control and range finding control in accordance with the calculation result. Thus, a through-the-lens (TTL) autofocus (AF) process, an auto exposure (AE) process, a pre-flash (EF) process, and the like are performed.

The image processing unit 24 further performs a TTL auto white balance (AWB) process by using the picked-up image data. The output data from the A/D converter 23 is directly written into a memory 32 via the memory control unit 15. Alternatively, the output data is written into the memory 32 via the image processing unit 24 and the memory control unit 15. The memory 32 stores image data obtained by the image pickup device 22 and converted to digital data by the A/D converter 23 and image data to be displayed on the display unit 28 or the EVF module 29.

The memory 32 has a sufficient storage capacity to store a predetermined number of still images, and a predetermined length of videos and audios. The memory 32 also serves as a memory (video memory) for image display. A D/A converter 19 converts data for image display, stored in the memory 32, to an analog signal and supplies the analog signal to the display unit 28 or the EVF module 29. Thus, an image is displayed.

The display unit 28 and the EVF module 29 each display information according to an analog signal from the D/A converter 19 on a display device, such as an LCD and an organic EL display. An external viewfinder display unit 43 displays various setting values of the camera, including a shutter speed and an aperture value, via an external viewfinder display unit drive circuit 44. A nonvolatile memory 56 is an electrically erasable and recordable memory. For example, an EEPROM or the like is used as the nonvolatile memory 56. Constants, programs, and the like for the operation of the system control unit 50 are stored in the nonvolatile memory 56.

The system control unit 50 is a control unit made up of at least one processor, such as a CPU, or the like, and controls the entire digital camera 100. The system control unit 50 implements processes of the present embodiment (described later) by running computer programs recorded on the above-described nonvolatile memory 56. For example, a RAM is used as a system memory 52. Constants and variables for the operation of the system control unit 50, programs loaded from the nonvolatile memory 56, and the like are expanded on the system memory 52. The system control unit 50 also executes display control by controlling the memory 32, the D/A converter 19, the display unit 28, and the like.

A system timer 53 is a time measurement unit that measures a time used in various controls and a time of a built-in clock. The mode select switch 60, a first shutter switch 62, a second shutter switch 64, and the operation unit 70 are operation devices for inputting various operation instructions to the system control unit 50. The mode select switch 60 switches the operation mode of the system control unit 50 to any one of a still image shooting mode, a video shooting mode, a playback mode, and the like.

The still image shooting mode includes an auto shooting mode, an auto scene recognition mode, a manual mode, an aperture priority mode (Av mode), a shutter speed priority mode (Tv mode), a program AE mode (P mode), and the like. The still image shooting mode further includes various scene modes that provide shooting settings by shooting scene, a custom mode, and the like.

With the mode select switch 60, a user is able to directly switch into any one of these modes. Alternatively, it is also applicable that, after the screen is once switched to a shooting mode list screen with the mode select switch 60, any one of the plurality of modes displayed is selected, and the mode is switched to the selected mode with another operation member. Similarly, the video shooting mode may also include a plurality of modes.

The first shutter switch 62 turns on when the shutter button 61 provided in the digital camera 100 is in the middle of operation, that is, so-called pressed halfway (shooting preparation instruction) and generates a first shutter switch signal SW1. In response to the first shutter switch signal SW1, a shooting preparation operation, including an autofocus (AF) process, an auto exposure (AE) process, an auto white balance (AWB) process, a pre-flashing (EF) process, and the like, is started.

The second shutter switch 64 turns on when operation of the shutter button 61 completes, that is, so-called fully pressed (image shooting instruction), and generates a second shutter switch signal SW2. When the system control unit 50 receives the second shutter switch signal SW2, the system control unit 50 starts the operation of a series of shooting processing from when a signal is read out from the image pickup device 22 to when a picked-up image is written in the recording medium 200 as an image file.

The operation unit 70 is made up of various operation members as input units for receiving operation from a user.

The operation unit 70 of the image capturing apparatus shown in FIG. 1 includes at least one of the following components. In other words, the components include the shutter button 61, the main electronic dials 71, the power switch 72, the sub-electronic dial 73, the multi-direction key 74, the SET button 75, the video button 76, the AE lock button 77, the zoom button 78, the playback button 79, the menu button 81, and the like.

The power supply control unit 80 is made up of a battery detection circuit, a DC-DC converter, a switch circuit that switches a block to be energized, and the like and detects whether a battery is attached, the type of the battery, and the battery level. The power supply control unit 80 controls a DC-DC converter in accordance with the detection result and an instruction of the system control unit 50 and supplies a necessary voltage to the portions including the recording medium 200 for a necessary time period. The power supply unit 30 is made up of a primary battery, such as an alkaline battery and a lithium battery, a secondary battery, such as a NiCd battery, a NiMH battery, and a Li-ion battery, an AC adapter, or the like.

A recording medium I/F 18 is an interface with the recording medium 200, such as a memory card and a hard disk drive. The recording medium 200 is a recording medium, such as a memory card for recording shot images, and is made up of a semiconductor memory, a magnetic disk, or the like. A communication unit 54 connects in a wireless manner or by a wired cable and transmits and receives a video signal and an audio signal. The communication unit 54 is capable of connecting to a wireless local area network (LAN) and the Internet. The communication unit 54 is capable of communicating with an external device by Bluetooth (registered trademark) or Bluetooth Low Energy (BLE).

The communication unit 54 is capable of transmitting an image picked up by the image pickup device 22 (including an LV image) and an image recorded on the recording medium 200 to the outside and receiving an image or other various pieces of information from an external device. A posture detection unit 55 detects the posture of the digital camera 100 with respect to a gravitational direction. In accordance with the posture detected by the posture detection unit 55, it is possible to determine whether the image picked up by the image pickup device 22 is an image shot by holding the digital camera 100 horizontally or an image shot by holding the digital camera 100 vertically.

The posture detection unit 55 includes an acceleration sensor and a gyro sensor and is capable of detecting the motion (pan, tilt, lift, stationary, or the like) of the digital camera 100. An eyepiece detection unit 57 is an eyepiece sensor that detects whether an eye (object) is close to (is in contact with) the eyepiece portion 16 of the viewfinder or not (is not in contact with).

The system control unit 50 switches between show (display state) and hide (non-display state) of each of the display unit 28 and the EVF module 29 in accordance with the detection result of the eyepiece detection unit 57. More specifically, at least in a shooting standby state and when switching of a display destination is an auto switch mode, the display unit 28 is turned on as a display destination and the EVF module 29 is turned off while the eye is not in contact. On the other hand, while the eye is in contact, the EVF module 29 is turned on as a display destination, and the display unit 28 is turned off.

The touch panel 70a and the display unit 28 may be configured as one unit. For example, the touch panel 70a is configured such that the light transmittance does not interfere with the display of the display unit 28 and is attached to a top layer on the display surface of the display unit 28. Touch coordinates on the touch panel 70a are associated with display coordinates on the display screen of the display unit 28.

Thus, it is possible to provide a graphical user interface (GUI) that a user is able to directly operate a screen displayed on the display unit 28.

An eyeball is the ball of an eye whereas the eye is an organ that is sensitive to light. A line-of-sight detection unit 58 performs A/D conversion on an eyeball image picked up by a line-of-sight sensor 630 (CCD-EYE) (an eye image obtained by picking up the image of an eye) and transmits the result to the system control unit 50. The system control unit 50 extracts feature points to detect a line of sight from the eye image in accordance with a predetermined algorithm (described later) and calculates the line of sight (view point in a visual recognition image) of a user from the positions of the feature points.

Next, the structure around the upper lid of the digital camera 100 according to the present embodiment will be described with reference to FIGS. 3A and 3B.

Figure 3A:
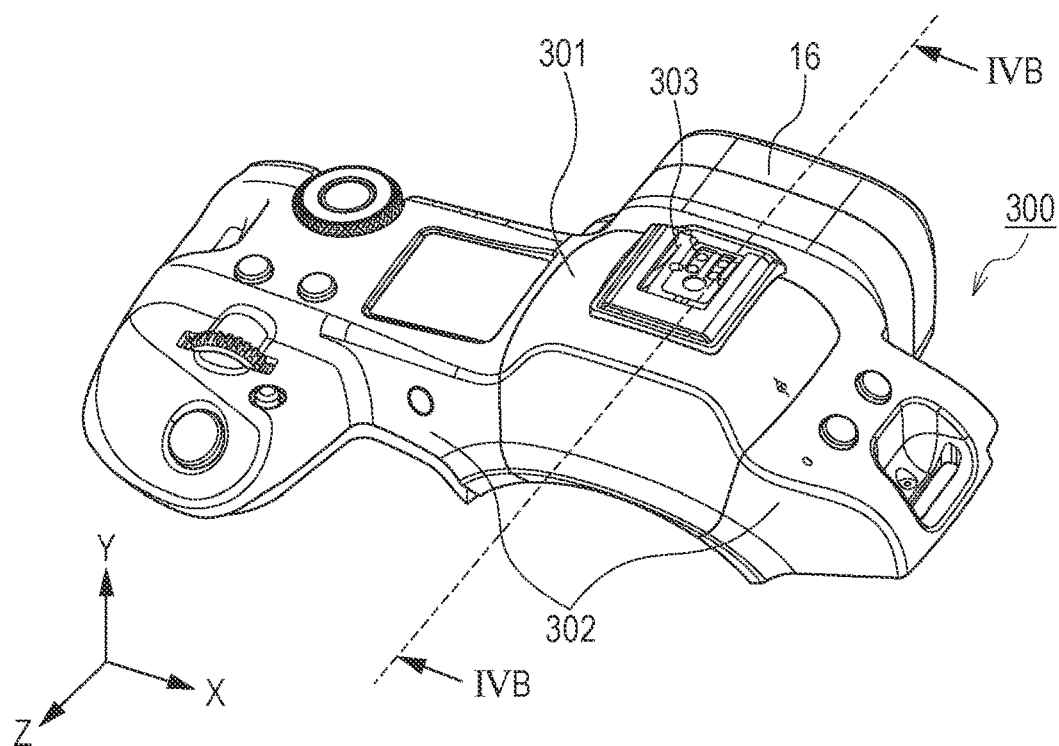
FIGS. 3A and 3B are external views of an upper lid portion of the digital camera according to the embodiment of the present disclosure.
Figure 3B:
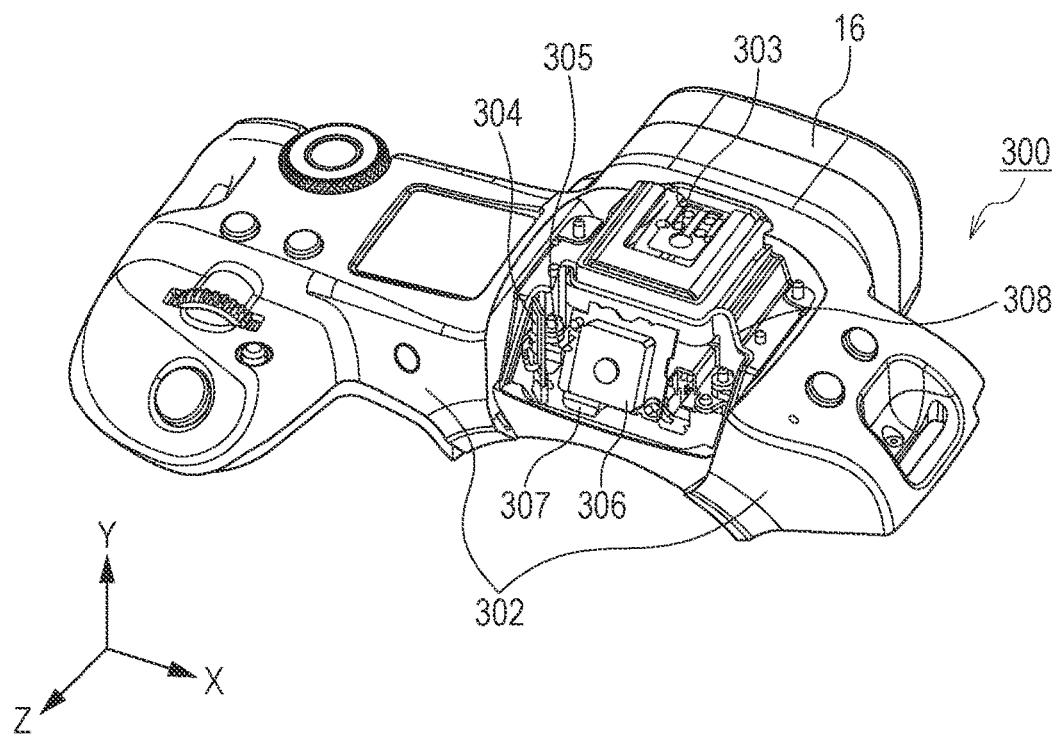

FIGS. 3A and 3B are external views of the upper lid portion 300 of the digital camera 100. FIG. 3A is an outer appearance view of the upper lid portion 300 of the digital camera 100. FIG. 3B is an outer appearance view in which a non-conductive outer casing 301 of the upper lid portion 300 shown in FIG. 3A is not shown. As shown in FIG. 3A, the upper lid portion 300 is made up of a conductive outer casing 302 having electrical conductivity.

The conductive outer casing 302 may be made of a metal material, such as magnesium and aluminum, or may be a conductive resin material containing carbon or the like. Alternatively, the surface of a resin member may be applied or coated with a conductive material. With the use of the conductive outer casing 302, a conductive member is generally higher in thermal conductivity than a non-conductive material, so heat dissipation properties are excellent, and heat can be dissipated to the entire upper lid portion 300.

Furthermore, the outer casing member is a conductive member, so shielding effectiveness is exercised, and it is effective to measures against electromagnetic interference (EMI), that is, electromagnetic wave generated from the digital camera 100 interferes with other electronic devices. Similarly, it is also effective to improvement in the characteristics of electromagnetic susceptibility (EMS), that is, resistance against noise that the digital camera 100 receives from external electronic devices.

The upper lid portion 300 is placed at the upper front of the body of the digital camera 100 serving as an optical apparatus and the upper front of the eyepiece frame 801 (described later), and the center of the upper lid portion 300 is partially made up of the non-conductive outer casing 301. The non-conductive outer casing 301 is a non-conductive member, such as a resin member, that does not conduct electricity. The non-conductive outer casing 301 covers just above a first wireless module 304 and a second wireless module 306. In the upper lid portion 300, an accessory shoe 303 is placed on the upper side of the non-conductive outer casing 301 adjacent to the back side.

The accessory shoe 303 has communication contacts in addition to an attaching/detaching mechanism. With the accessory shoe 303, an external accessory, such as an external flash and an external microphone, is able to be attached, detached, and used.

FIG. 3B is an outer appearance view of the upper lid portion 300 of the digital camera 100, in which the non-conductive outer casing 301 is not shown. As shown in FIG. 3B, the first wireless module 304 and the second wireless module 306 are placed just below the non-conductive outer casing 301. Packing 308 seals any gap between the upper lid portion 300 and the non-conductive outer casing 301. Thus, the inside of the digital camera 100 where the wireless modules are placed is dustproof and dripproof.

The first wireless module 304 and the second wireless module 306 are examples of the communication unit 54 and are electrical components that wirelessly communicate with an external device. Here, the first wireless module 304 includes, for example, a Wi-Fi (registered trademark) module or the like, and the second wireless module 306 includes, for example, a GPS module or the like. The conductive outer casing 302 performs electromagnetic shielding against wireless communication, GPS communication, and Bluetooth® communication, but the non-conductive outer casing 301 has no electromagnetic shielding effect. Therefore, when the non-conductive outer casing 301 covers just above the first wireless module 304 and the second wireless module 306, a wireless communication function is improved while heat dissipation properties and electromagnetic compatibility (EMC) characteristics are maintained.

The first wireless module 304 is fixed to a conductive holding member 305 by a screw, and the conductive holding member 305 is fastened to the conductive outer casing 302 by a screw. Thus, the ground (earth) of the first wireless module 304 is connected to the conductive outer casing 302 via the conductive holding member 305.

In other words, the first wireless module 304 and the second wireless module 306 are fixed to the upper lid portion 300, and the grounds of the first wireless module 304 and second wireless module 306 are connected to the conductive outer casing 302 provided in the upper lid portion 300.

In the present embodiment, the conductive holding member 305 is made up of a sheet metal of aluminum or stainless steel and may be a conductive resin member. The ground of the first wireless module 304 may be directly fixed to the conductive outer casing 302 without using the conductive holding member 305.

The second wireless module 306 is fixed to the non-conductive outer casing 301 by a screw. The ground (earth) of the second wireless module 306 is connected to the conductive outer casing 302 via a flexible printed circuit board 307.

Figure 4A:
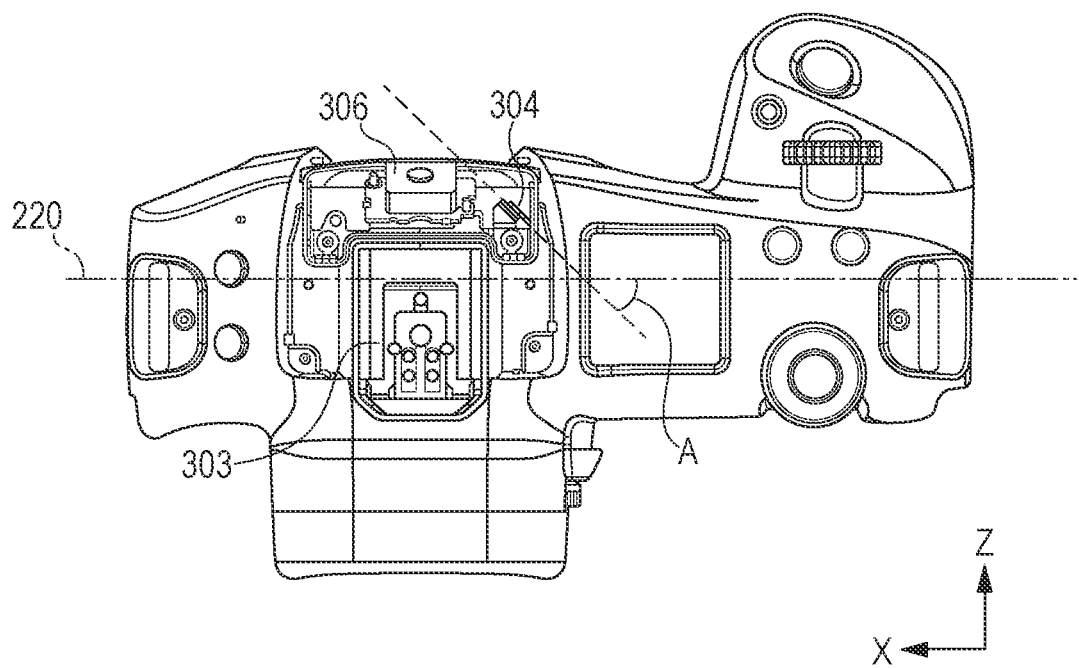
FIG. 4A is an outer appearance view showing the configuration of wireless modules according to the embodiment of the present disclosure.
Figure 4B:
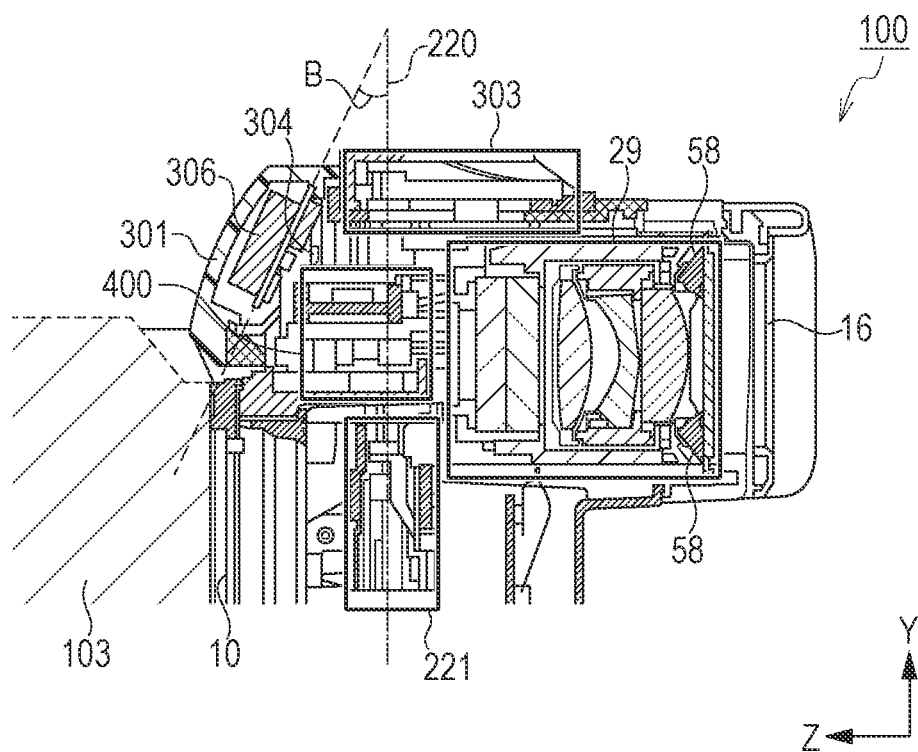
FIG. 4B is a sectional view showing the configuration of the wireless modules according to the embodiment of the present disclosure.

FIG. 4A is an outer appearance view showing the configuration of the wireless modules 304, 306 according to the embodiment. FIG. 4B is a sectional view showing the configuration of the wireless modules 304, 306 according to the embodiment. FIGS. 4A and 4B show an example of the layout of the wireless modules in the upper lid portion 300.

FIG. 4A is a top view of the upper lid portion 300. FIG. 4B is a sectional view in a Y direction of the upper lid portion 300, taken along the line IVB-IVB in FIG. 3A.

As EVF modules become more sophisticated in functionality, the size of the EVF modules is increasing. A plurality of modules with multiple functions is to be placed in a state where the respective functions are satisfied with no influence on the outside dimensions of the digital camera 100 as much as possible. The layout of the first wireless module 304 and the second wireless module 306 will be described with reference to FIGS. 4A and 4B.

A device 400 is the posture detection unit 55 made up of an acceleration sensor and a gyro sensor that detect the posture of the camera and detect camera shake, a near field radio communication unit that communicates with an external device, or the like. Alternatively, the device 400 may be a mechanical part, such as a fan for forced air cooling inside the digital camera 100 and radiator fins for cooling by increasing the surface area.

The first wireless module 304 and the second wireless module 306 are placed inside the upper lid portion 300 and placed between the accessory shoe 303 and the lens mount 10 in the thickness direction (Z direction in the drawing) of the digital camera 100. When the first wireless module 304 is covered with the hand of a user, or the like, the wireless characteristics may decrease, for example, the communication distance reduces or the communication speed decreases, under the influence of a human body.

When the first wireless module 304 is placed near the eyepiece portion 16, the wireless characteristics may decrease under the influence of the face of a user when the eye is in contact with the eyepiece portion 16 to use the EVF module 29. For these reasons, the first wireless module 304 can be placed at the front side of the digital camera 100 remote from the eyepiece portion 16. The first wireless module 304 is placed such that an antenna pattern 500 (described later) of the first wireless module 304 is oriented at an angle A with respect to the second wireless module 306. The angle A in the present embodiment is assumed as 45°.

The angle A is set to such an angle that the second wireless module 306 substantially does not overlap an extension line of the plane of the antenna pattern 500 of the first wireless module 304. The first wireless module 304 is placed such that the substantial direction of the extension line of the antenna pattern 500 plane of the first wireless module 304 is inclined with respect to the front and rear direction and transverse direction of the digital camera 100.

When the first wireless module 304 and the second wireless module 306 are placed in accordance with the above angular relationship, the metal member in the upper lid portion 300 does not interfere with the area where the gain of the antenna pattern 500 is high. Therefore, the first wireless module 304 and the second wireless module 306 are less likely to block radio waves transmitted and received by the antenna pattern 500, and can be placed in a compact space.

In the present embodiment, a specific absorption rate (SAR) is also considered. In other words, in consideration of the influence of radio waves radiated from the antenna surface on a human body, a spatial distance is provided according to an electric field strength between an outer casing surface part that a user is able to touch and the antenna pattern 500. An electric field strength is radially distributed from the antenna pattern 500 plane. For this reason, when, for example, the outer casing is flat, a spatial distance along a vertical line to the antenna pattern 500 plane is minimum, with the result that the influence on a human body due to SAR increases.

Accordingly, in the present embodiment, a substantially vertical direction to the antenna pattern 500 plane is substantially the same direction as the direction in which the outer protruded shape of the non-conductive outer casing 301 protrudes. In other words, the non-conductive outer casing 301 has a protruded shape in the substantially vertical direction to the antenna pattern 500 plane, and a sufficient spatial distance is ensured between the antenna pattern 500 plane and the non-conductive outer casing 301. Therefore, according to the present embodiment, it is possible to increase the electric field strength for ensuring communication performance in consideration of SAR.

In the present embodiment, the first wireless module 304 is placed on the grip side of the digital camera 100 with respect to the second wireless module 306. However, according to the outer appearance design shape of the upper lid portion 300 and the non-conductive outer casing 301 or placement constraints due to the device 400, the first wireless module 304 may be placed on the opposite side with respect to the optical axis center of the digital camera 100 in a state where the angle is maintained.

The second wireless module 306 is used as a GPS receiver for measuring the location of the digital camera 100. The second wireless module 306 is placed between the accessory shoe 303 and the lens mount 10 at an angle B with respect to an imaging plane 220 of the digital camera 100 as shown in FIG. 4B. In the present embodiment, the angle B is assumed as 25°.

The angle B is set to such an angle that the extension direction of the antenna pattern plane of the second wireless module 306, that is, the dashed line in FIG. 4B, substantially does not overlap the outer appearance side of the accessory shoe 303. The second wireless module 306 is placed such that the substantial direction of the extension line of the antenna pattern plane of the second wireless module 306 is inclined with respect to the front and rear direction and upper direction of the digital camera 100 at an angle so as not to overlap part of the accessory shoe 303.

This is because the receiving sensitivity of the wireless characteristics of the GPS receiver can decrease due to surrounding metal members. In other words, in the present embodiment, the second wireless module 306 is placed so as to protrude from the opening of the upper lid portion 300. The second wireless module 306 is placed at an angle such that the extension direction of the antenna pattern plane of the second wireless module 306, that is, the dashed line in FIG. 4B, does not overlap the outer appearance side of the accessory shoe 303.

In this way, the sensitivity in a zenith direction, that is, the Y direction of the digital camera 100, is ensured while the influence of the metal member of the accessory shoe 303 is reduced by the angle B. Even when the size of the EVF module 29 is increased, the two modules, that is, the first wireless module 304 and the second wireless module 306, are able to be efficiently placed between the accessory shoe 303 and the lens mount 10 without increasing the outline of the digital camera 100.

In the present embodiment, the second wireless module 306 has the angle B only with respect to the imaging plane 220 of the digital camera 100 in the Y direction. However, according to the outer appearance design shape of the upper lid portion 300 and the non-conductive outer casing 301 or placement constraints due to the device 400, the second wireless module 306 may be placed at an angle with respect to the Y axis and Z axis of the digital camera 100 in a state where the angle B is maintained.

The second wireless module 306 may be a satellite positioning system other than GPS and may be, for example, a system, such as GLONASS, capable of measuring the location of the digital camera 100.

Here, all the first wireless module 304, the second wireless module 306, the device 400, the accessory shoe 303, and the EVF module 29 do not need to overlap in the Z direction or the Y direction. For example, the digital camera 100 may be configured not to include the device 400. In this case, when the EVF module 29 is configured to overlap an image pickup unit including the image pickup device 22 in the Y direction, the outline of the digital camera 100 is further downsized.

In this way, the first wireless module 304 and the second wireless module 306 are placed at non-overlapping positions between the accessory shoe 303 and the lens mount 10 in the front and rear direction (the optical axis direction or the Z direction) of the digital camera 100. Therefore, an increase in the size of the digital camera 100 can be minimized.

Figure 5A:
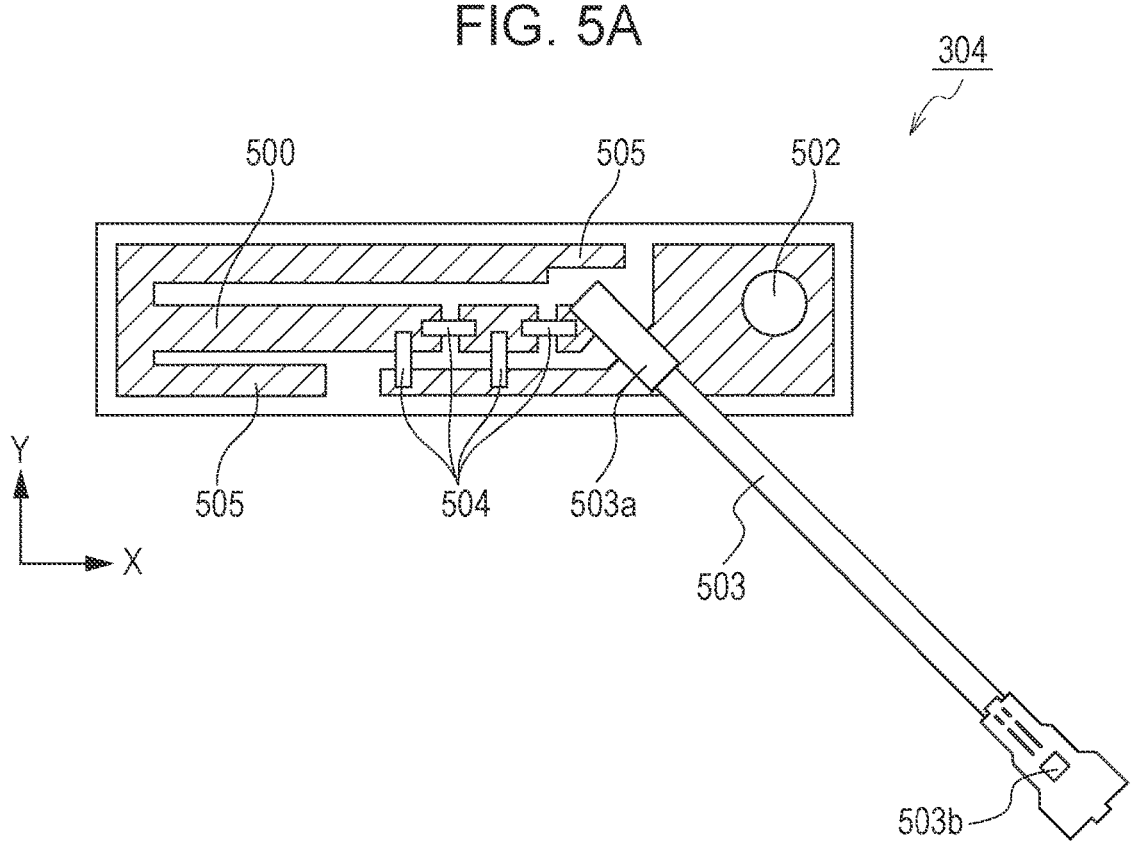
FIGS. 5A and 5B are outer appearance views of the first wireless module according to the embodiment of the present disclosure.
Figure 5B:
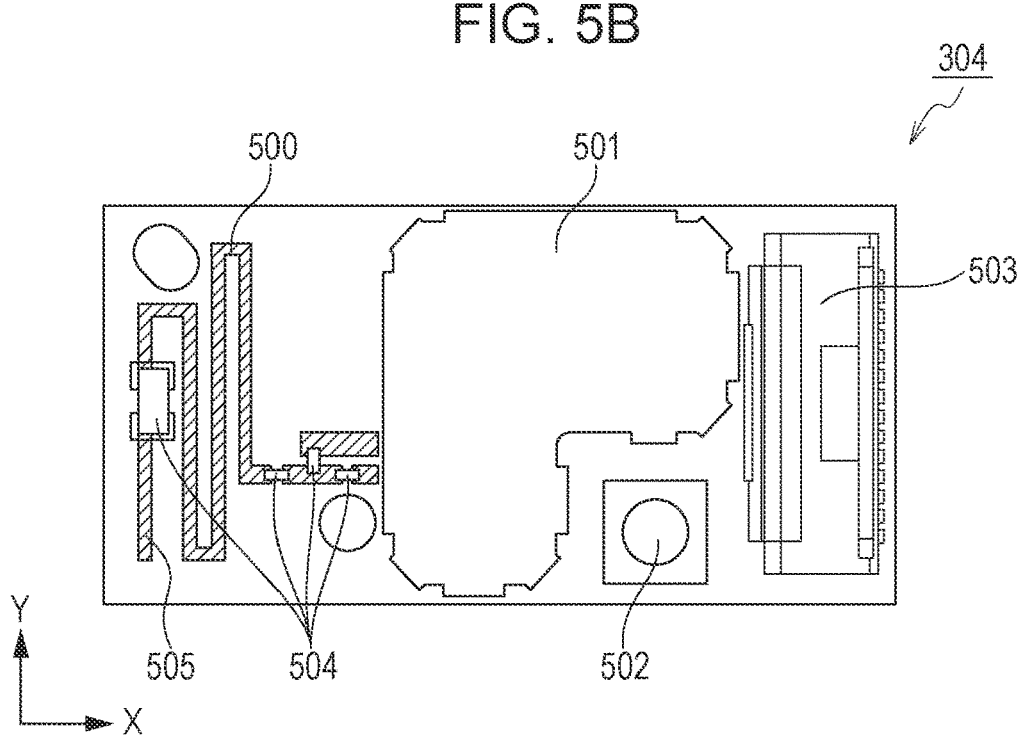

FIGS. 5A and 5B are outer appearance views of the first wireless module 304. FIG. 5A shows an example in the case where the first wireless module 304 includes the antenna pattern 500 and does not include a signal processing unit 501 (described later). FIG. 5B shows an example in the case where the first wireless module 304 includes the antenna pattern 500 and the signal processing unit 501.

Hereinafter, the case where the first wireless module 304 includes the antenna pattern 500 and does not include the signal processing unit 501 (described later) will be described with reference to FIG. 5A.

The first wireless module 304 is a printed circuit board, and the antenna pattern 500 is made of a conductive material, such as copper. The first wireless module 304 is not limited to a printed circuit board and may be a flexible printed circuit board.

The antenna pattern 500 is not limited to this shape, and the pattern may be changed within the range in which efficient wireless characteristics are obtained. The first wireless module 304 includes a fixing portion 502 fixed to the above-described conductive holding member 305, and the ground is electrically connected to the conductive holding member 305 at the fixing portion 502.

In the present embodiment, the fixing portion 502 is a round hole and is fastened to the conductive holding member 305 by a screw; however, the fixing portion 502 is not limited to fastening by a screw. The fixing portion 502 may be fixed by conductive double-sided adhesive tape or may be fixed by conductive adhesive material. The first wireless module 304 includes a transfer portion 503 made up of a thin coaxial cable, and a signal obtained by the antenna pattern 500 is transferred to a circuit board (not shown).

The first wireless module 304 side of the transfer portion 503 is a module-side connecting portion 503a. The transfer portion 503 and the first wireless module 304 are electrically connected by solder.

The other side of the transfer portion 503 is a connection destination connecting portion 503b made up of a connector and connected to the circuit board (not shown) by the connector.

The module-side connecting portion 503a and the connection destination connecting portion 503b both may be connected by a connector or may be connected by solder. Since the cable of the transfer portion 503 is made up of a thin coaxial cable, not only noise from the outside but also noise emitted from the transfer portion 503 is blocked. The transfer portion 503 is not limited to a thin coaxial cable and may be a general wire or may be connected by a flexible printed circuit board.

The signal processing unit 501 that processes a signal output from the antenna pattern 500 is implemented on the circuit board to which the connection destination connecting portion 503b is connected. The signal processing unit 501 is made up of an IC, such as an integrated circuit. The signal processing unit 501 and the system control unit 50 enable communication between the digital camera 100 and an external apparatus. When the signal processing unit 501 is separately formed from the first wireless module 304 as shown in FIG. 5A, the wireless module itself can be downsized. Thus, in the digital camera 100, the wireless module can be disposed in a place where the wireless module cannot be placed in the existing art.

Electric components, such as a resistor, an inductor, and a capacitor, are mounted at component mounting portions 504 in FIG. 5A. Thus, antenna characteristics can be tuned. In other words, when the same first wireless module 304 is used in a different digital camera 100 as well, the first wireless module 304 is tuned by changing the electrical components at the component mounting portions 504. Thus, the different digital camera 100 is also capable of performing wireless communication under optimal conditions.

As shown in FIG. 5A, in the first wireless module 304, the fixing portion 502, the transfer portion 503, the component mounting portions 504, and the antenna pattern 500 are placed in this order in substantially the same straight line. Thus, the first wireless module 304 can be downsized. The transfer portion 503 can be extended not to the extension line of the antenna pattern 500 but to the direction at an angle of 45°. This is also similarly to downsize the first wireless module 304 in the short side direction as much as possible.

In the antenna pattern 500, an antenna pattern open end 505 is present at an end, and the antenna pattern open end 505 is placed on the non-conductive outer casing 301 side in the upper lid portion 300. This is because the antenna pattern open end 505 that is the end of the antenna pattern 500 has the strongest wireless characteristics and, therefore, the reception efficiency increases by bringing the antenna pattern open end 505 close to the non-conductive outer casing 301 that is the outer casing as much as possible. In addition to the conductive holding member 305, an additional thin coaxial cable handling portion made of a resin material or the like may be provided around the first wireless module 304 to handle the thin coaxial cable of the transfer portion 503.

Next, the case where the first wireless module 304 includes both the antenna pattern 500 and the signal processing unit 501 will be described with reference to FIG. 5B.

The first wireless module 304 includes the transfer portion 503 that connects the signal processing unit 501 that processes a signal output from the antenna pattern 500 to the circuit board on which the system control unit 50 is mounted. In the present embodiment, the transfer portion 503 is a flexible connector; however, not limited to a thin coaxial cable and may be a general connector. Alternatively, the signal processing unit 501 may be connected to the circuit board by a cable, such as a thin coaxial cable.

The signal processing unit 501 is made up of an IC, such as an integrated circuit, and a signal output from the antenna pattern 500 is processed by the signal processing unit 501. The system control unit 50 on the circuit board and the signal processing unit 501 of the first wireless module 304 are connected by the transfer portion 503 of the first wireless module 304 and communicate with each other. Thus, it is possible to perform wireless communication with an external device.

Detailed Description of Viewfinder Unit 900

Figure 6:
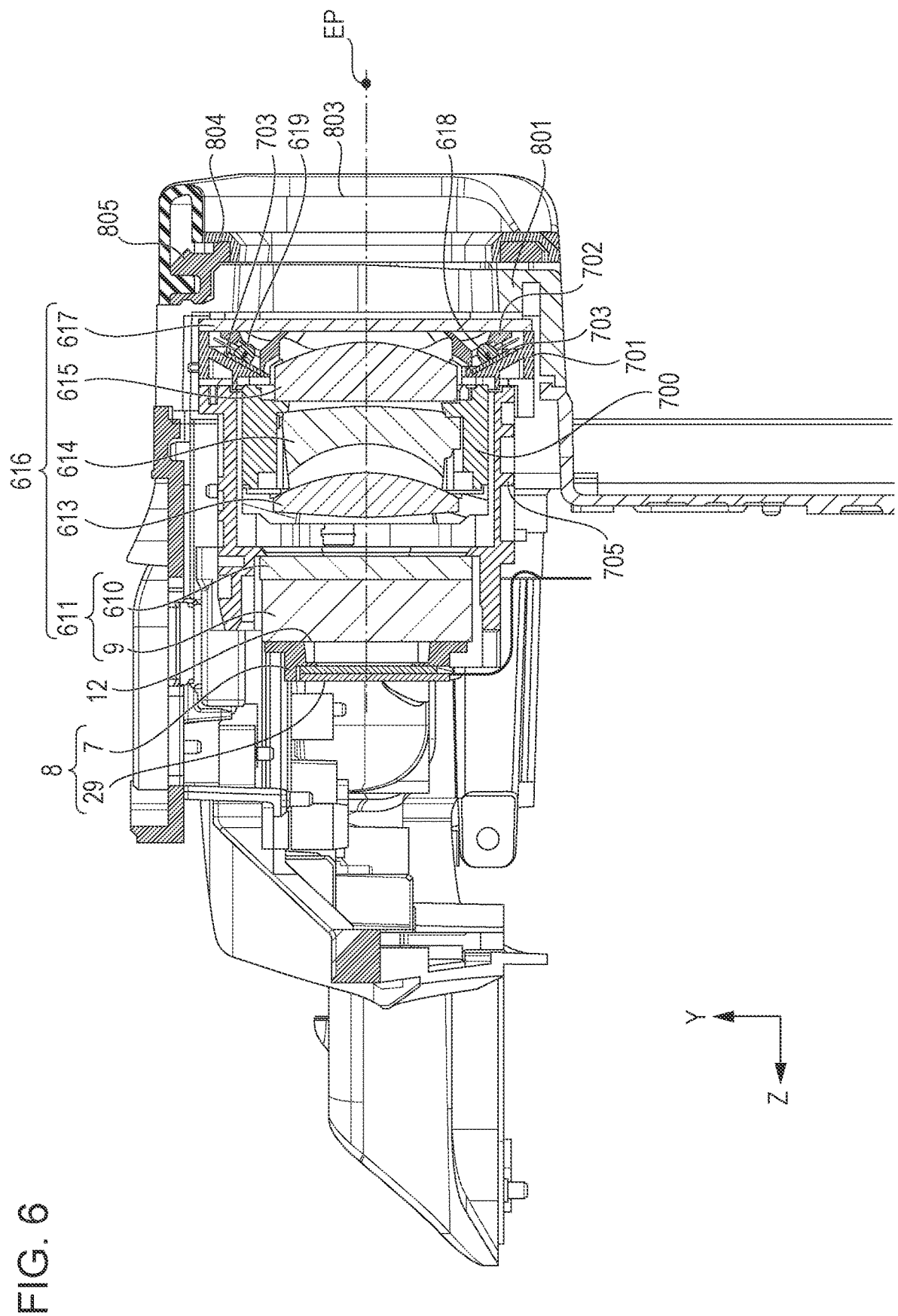
FIG. 6 is an optical axis sectional view of a viewfinder unit for illustrating the configuration of the viewfinder unit according to the embodiment of the present disclosure.

Hereinafter, the details of the viewfinder unit 900 according to the present embodiment will be described with reference to the related drawings. FIG. 6 is an optical axis sectional view of the viewfinder unit 900 for illustrating the configuration of the viewfinder unit 900 according to the embodiment of the present disclosure. The cross section shown in FIG. 6 is an optical axis sectional view with reference to the optical axis of an EVF lens group 616 (hereinafter, referred to as EVF optical axis) that is an optical member included in the viewfinder unit 900. In the present embodiment, the EVF optical axis direction of the viewfinder unit 900 shown in FIG. 6, the portions from the EVF module 29 to the eyepiece frame 801 of the eyepiece cover 800 (described later) are collectively referred to as the viewfinder unit 900. The viewfinder unit 900 according to the present embodiment is configured to be capable of not only displaying a menu and an image as in the case of the display panel 5 but also detecting the line of sight of a user and reflecting the detection result in control over the digital camera 100.

The EVF module 29, as in the case of the display panel 5, is used to display a menu or an image to operate the digital camera 100 or view or edit an image obtained by the digital camera 100 when a user is looking into the eyepiece portion 16. The EVF module 29 is made up of a backlight-equipped liquid crystal panel, an organic EL panel, or the like.

The reference numeral 7 indicates a panel holder that holds the EVF module 29. The EVF module 29 and the panel holder 7 are fixedly bonded to each other to make up a display panel unit 8. A first optical path division prism 9 and a second optical path division prism 610 are stuck to each other to make up an optical path division prism unit 611 (optical path division member).

Figure 7:
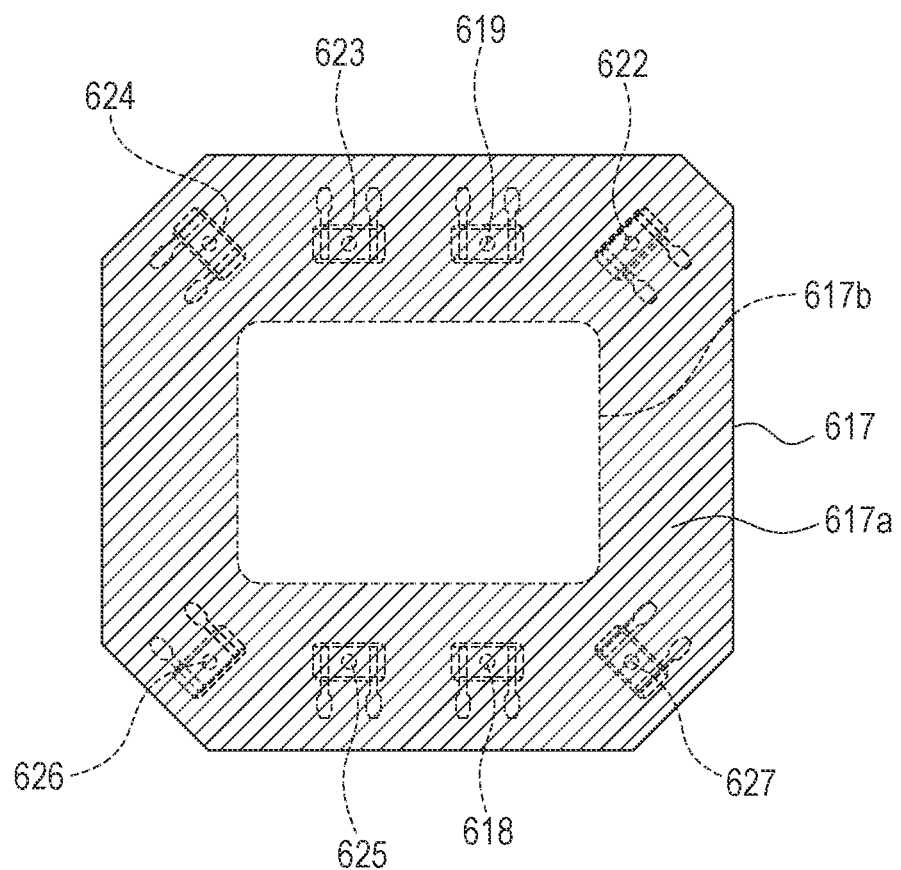
FIG. 7 is a detail view for illustrating the configuration of an eyepiece window according to the embodiment of the present disclosure.

The optical path division prism unit 611 guides a light flux from a second display panel to an eyepiece window 617 provided at a sight hole for a user and guides reflected light or the like from the eye (pupil) guided from the eyepiece window 617 to the line-of-sight sensor 630 shown in FIG. 7. The display panel unit 8 and the optical path division prism unit 611 are fixed with a mask 12 interposed therebetween and formed as one unit.

The mask 12 may be directly formed on the surface of the first optical path division prism 9 by sputtering, printing, or the like. The EVF lens group 616 is made up of the optical path division prism unit 611, a G1 lens 613, a G2 lens 614, a G3 lens 615, the eyepiece window 617, and the like. A fixed barrel 705 is a first holding member that holds the above-described optical path division prism unit 611. A lens holder 700 is a second holding member that holds the G1 lens 613, the G2 lens 614, and the G3 lens 615 that are EVF optical members according to the present embodiment. The lens holder 700 is configured to be capable of moving in the EVF optical axis direction with respect to the fixed barrel 705. The lens holder 700 includes an adjustment mechanism (not shown) and allows a user looking into the eyepiece portion 16 to move the positions of the lenses so as to adjust diopter within a determined range. Any configuration may be adopted for the diopter adjustment mechanism as long as it is a known technology, and a specific description is omitted.

FIG. 7 is a detailed view for illustrating the configuration of the eyepiece window.

The eyepiece window 617 is a transparent member that transmits visible light and is fixed to the infrared LED holder 702 (described later). An image displayed on the display panel unit 8 is observed through the EVF lens group 616 including the optical path division prism unit 611 and the eyepiece window 617.

A diagonally shaded area 617a of the eyepiece window 617 is a mask in which ink or the like that absorbs visible light and transmits infrared light is printed on the infrared LED-side surface so that infrared LEDs 618, 619, 622, 623, 624, 625, 626, 627 are not visually recognized from a user. A viewfinder opening 617b is an opening for observing an optical image.

Figure 8A:
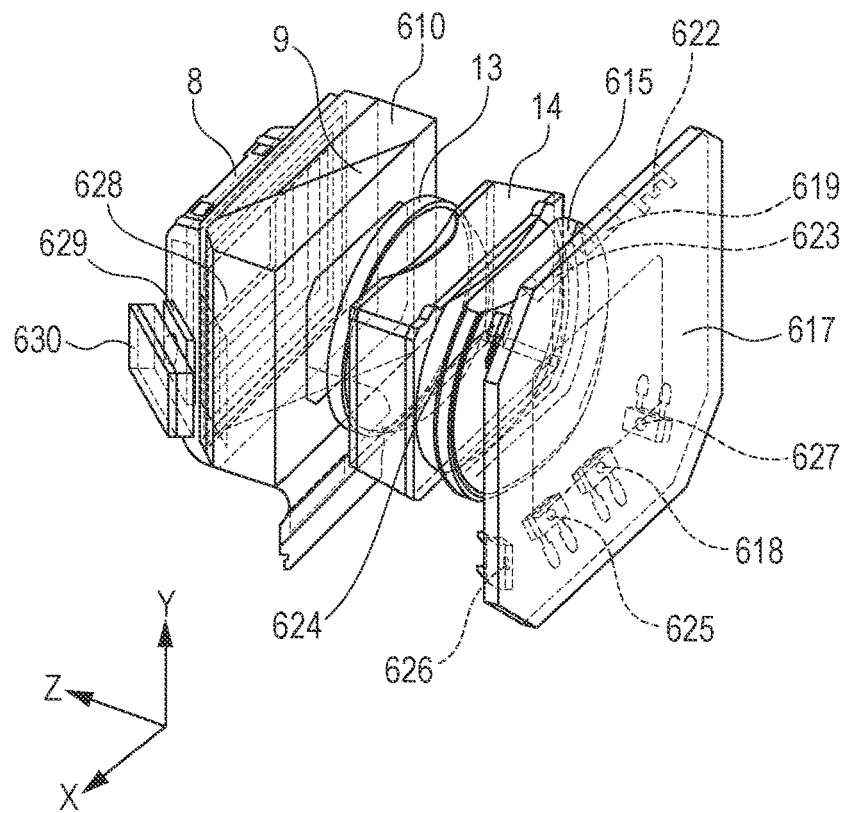
FIG. 8A is a perspective view of an optical system including a line-of-sight detection mechanism according to the embodiment of the present disclosure.
Figure 8B:
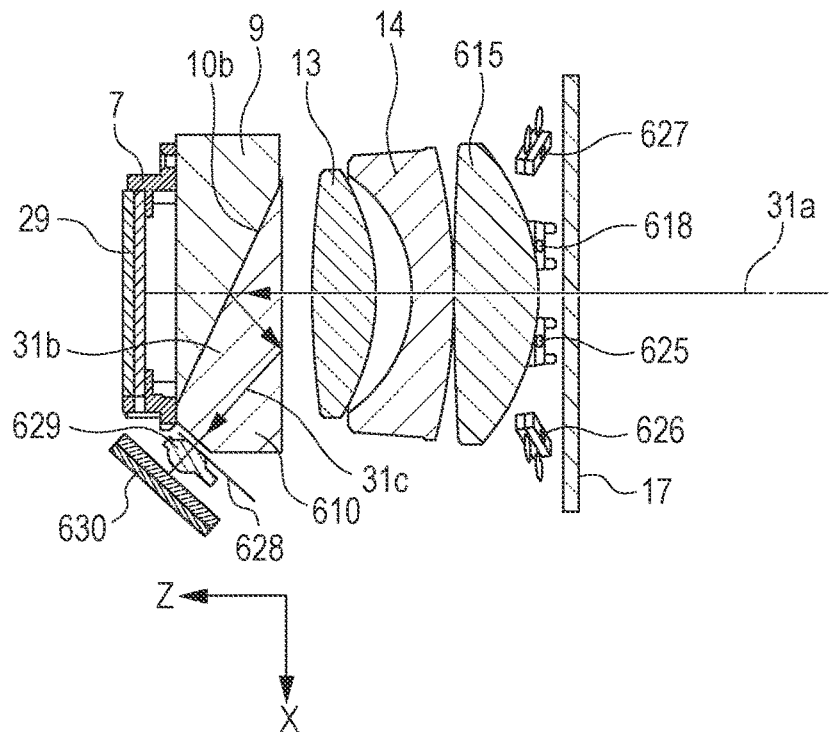
FIG. 8B is a sectional view of the optical system including the line-of-sight detection mechanism according to the embodiment of the present disclosure.

FIG. 8A is a perspective view showing the viewfinder unit 900 according to the present embodiment. FIG. 8B is an axial sectional view of the viewfinder unit 900, taken along the EVF optical axis. The infrared LEDs 618, 619, 622, 623, 624, 625, 626, 627 are respectively provided in different positions and different postures and are placed to apply infrared light toward the eyeball of a user.

Figure 18:
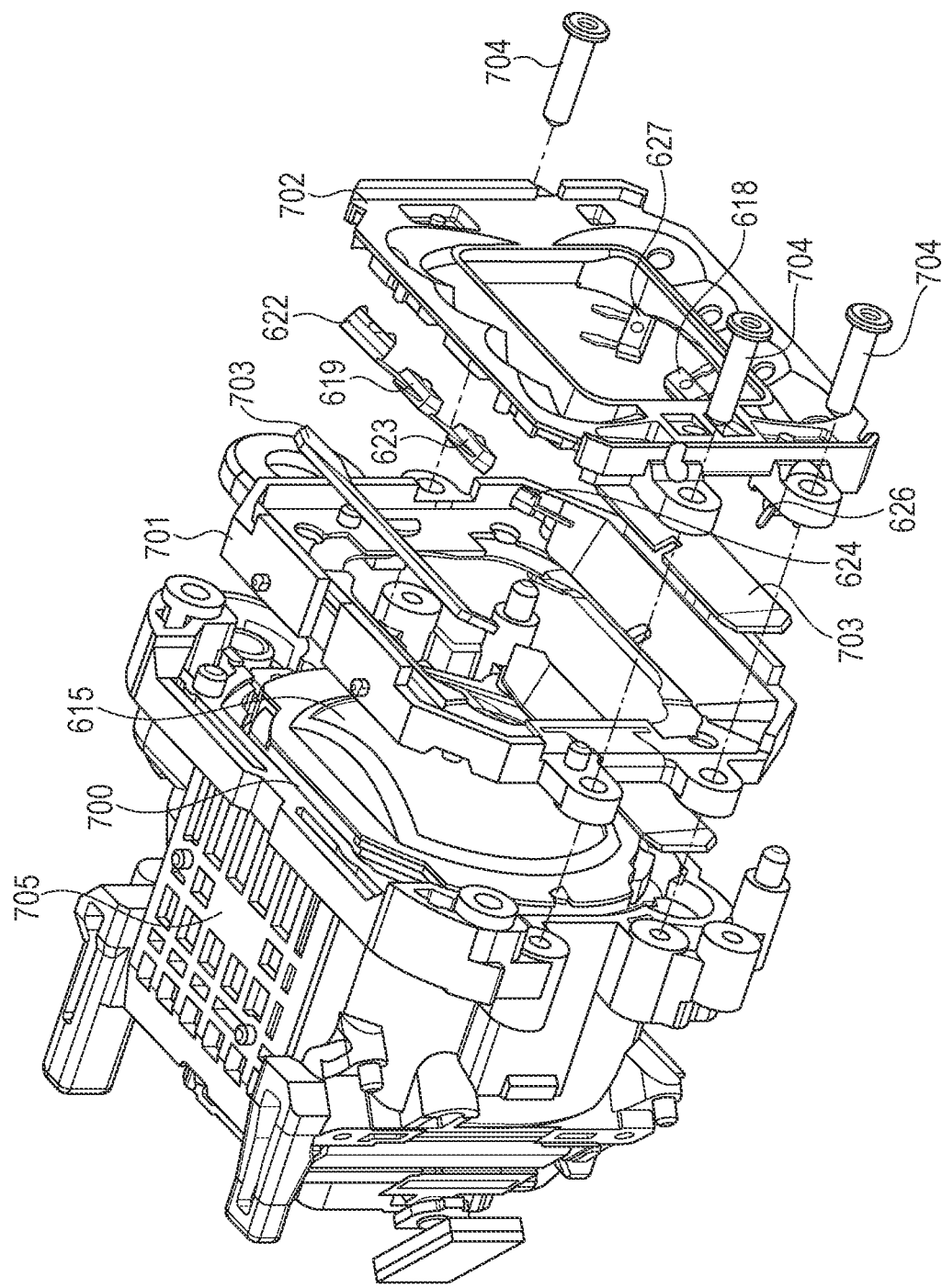
FIG. 18 is an exploded perspective view of mainly an infrared LED holding part in the viewfinder unit according to the embodiment of the present disclosure.
Figure 19:
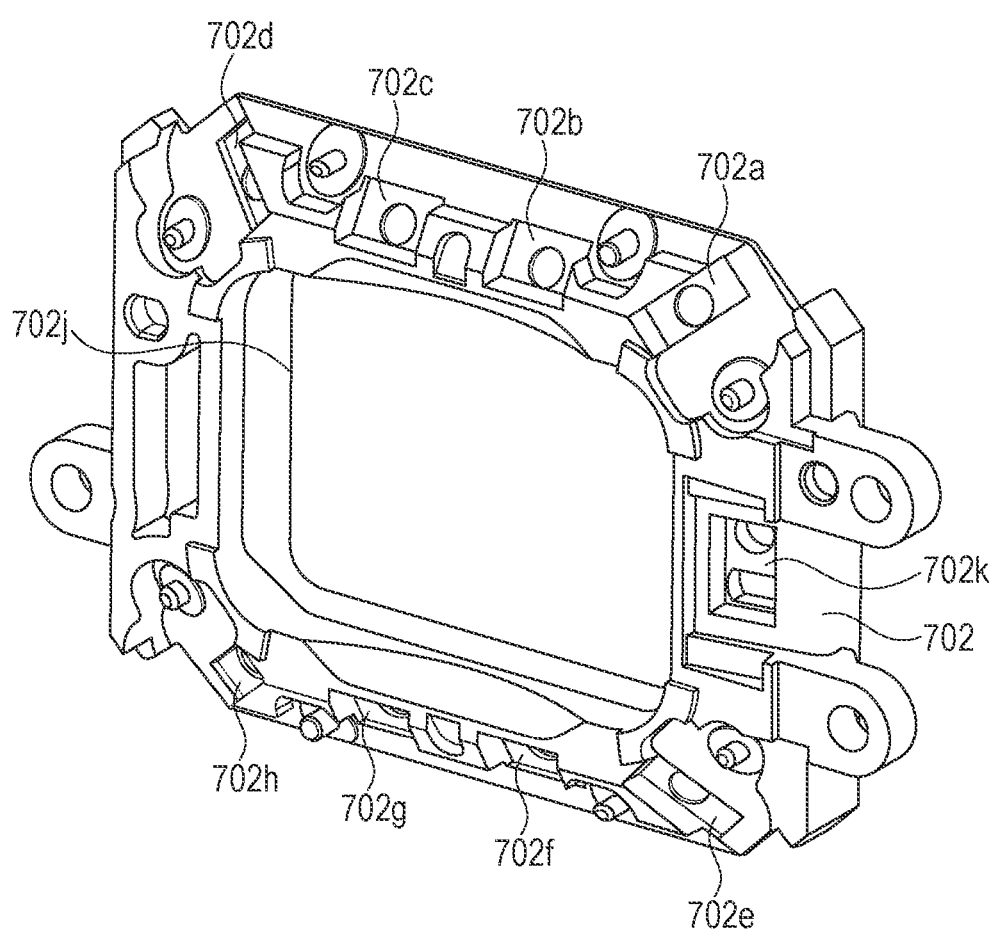
FIG. 19 is a back side perspective view of an infrared LED holder according to the embodiment of the present disclosure.

Here, positions at which the infrared LEDs (light sources for line-of-sight detection) will be specifically described with reference to FIGS. 18 and 19. FIG. 18 is an exemplary exploded perspective view mainly showing an infrared LED holding part in the viewfinder unit 900 according to the embodiment of the present disclosure. FIG. 19 is a back side perspective view of the infrared LED holder 702 according to the embodiment of the present disclosure. As shown in FIGS. 18 and 19, the infrared LEDs 618, 619, 622, 623, 624, 625, 626, 627 are held between an infrared LED plate 701 and recesses 702a to 702h provided on the back side (that is, subject side) of the infrared LED holder 702 in a state of being urged by an elastic member 703 toward the infrared LED holder 702. Hereinafter, the infrared LED holder 702 and the infrared LED plate 701 are collectively referred to as an infrared LED holding member. The infrared LED holding member is fixed to the fixed barrel 705 by fastening members 704.

The infrared LEDs 618, 619, 623, 625 are illumination devices according to the present embodiment and are infrared LEDs capable of applying light in an infrared wavelength range as illumination portions for near-field illumination. The infrared LEDs 622, 624, 626, 627 are illumination devices according to the present embodiment and are infrared LEDs capable of applying light in the infrared wavelength range as illumination portions for far-field illumination. In the present embodiment, the infrared LEDs are separately used for near field and far field; however, the configuration is not limited thereto. For example, regardless of distance, all the infrared LEDs may be configured to be used at the time of detecting the line of sight of a photographer. Alternatively, for example, the line of sight of a photographer may be configured to be detected by using a combination of infrared LEDs different from the above according to a distance from (the eyeball of) the photographer.

Referring back to FIG. 8A, a line-of-sight detection optical system including a diaphragm 628 and a line-of-sight image-forming lens 629 further guides infrared reflected light guided from the eyepiece window 617 by the optical path division prism unit 611 to the line-of-sight sensor 630. The optical path division prism unit 611 is made up of the first optical path division prism 9 and the second optical path division prism 610.

In FIG. 8B, the image of the eyeball of a user looking in, illuminated by the infrared LEDs, enters an entrance face (second face) 610a of the second optical path division prism 610 through the eyepiece window 617, the G3 lens 615, the G2 lens 614, and the G1 lens 613. This optical path is indicated by 31a. A dichroic film that reflects infrared light is formed on a first face 610b of the second optical path division prism 610.

Therefore, the eyeball image illuminated by the infrared LEDs shown in FIG. 8A reflects on the first face 610b toward the second face 610a. This reflection optical path is indicated by 31b. The reflection optical path 31b totally reflects on the second face 610a, passes through the diaphragm 628 as an image-forming optical path 31c, and forms an image on the line-of-sight sensor 630 by the line-of-sight image-forming lens 629.

A corneal reflection image formed by specular reflection of infrared LED light from a cornea is used in combination with an eyeball image formed by illumination to detect a line of sight.

Figure 9:
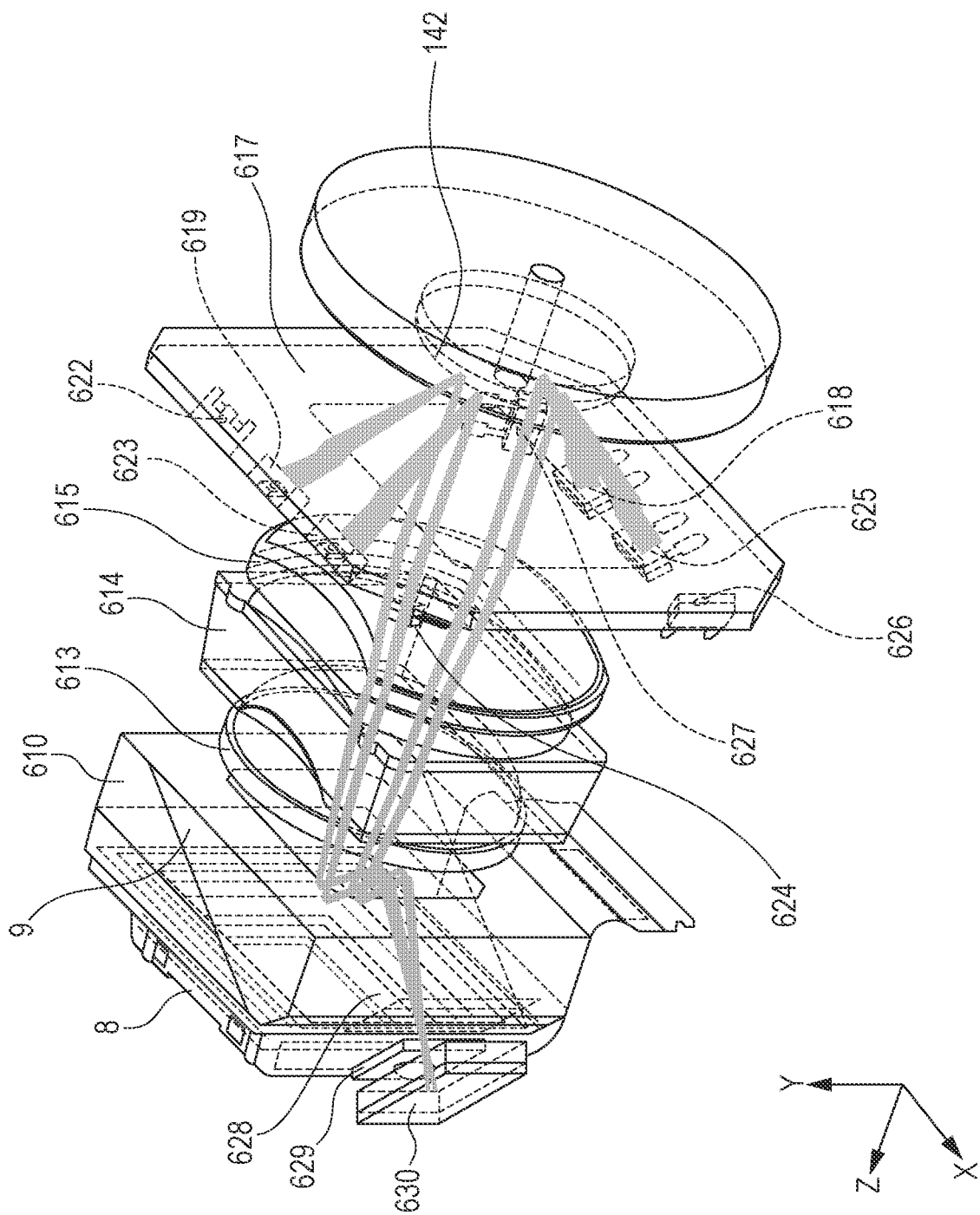
FIG. 9 is a light path diagram when a line of sight is detected by using the line-of-sight detection mechanism according to the embodiment of the present disclosure.

FIG. 9 is a light path diagram at the time of detecting a line of sight by using the line-of-sight detection mechanism according to the embodiment. FIG. 9 shows an example of optical paths along which rays of light emitted from the near-field illumination infrared LEDs 618, 619, 623, 625 reflect on a cornea 142 of an eyeball and then converge on the line-of-sight sensor 630. Like reference numerals denote portions corresponding to those of FIGS. 8A and 8B.

Figure 20:
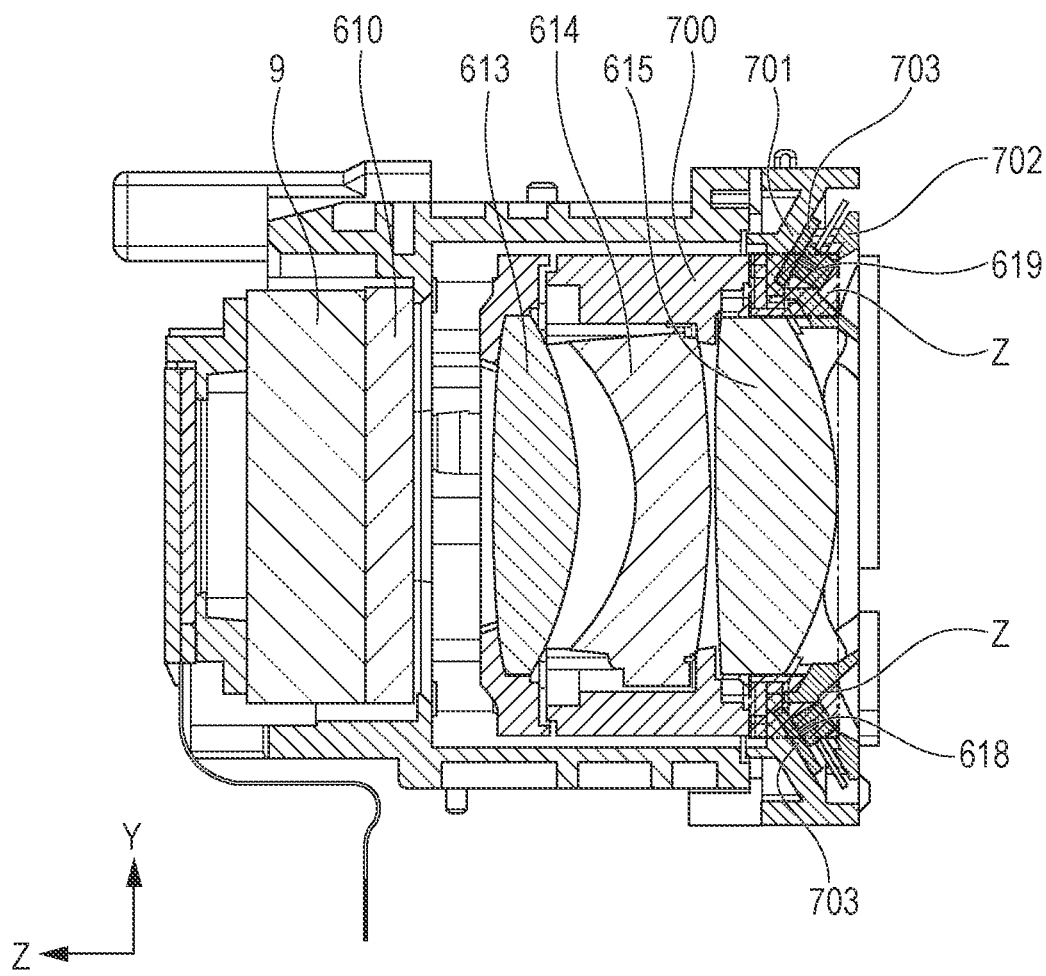
FIG. 20 is a view for exemplarily illustrating a positional relationship in an EVF optical axis direction among portions that make up the viewfinder unit according to the embodiment of the present disclosure.

Here, the layout of the portions in the viewfinder unit 900 will be specifically described with reference to FIG. 20. FIG. 20 is a view for exemplarily illustrating a positional relationship in the EVF optical axis direction among the portions that make up the viewfinder unit 900 according to the embodiment of the present disclosure. FIG. 20 is an X-axis sectional view at the center position of the infrared LED holder 702 for illustrating an area Z (described later).

The G3 lens 615 is a convex lens of which the optical surface projects toward a photographer (a user looking into the eyepiece portion 16) with respect to the lens holder 700 and is bonded to and held by the lens holder 700. An opening 702j is provided at the center of the infrared LED holder 702. The optical surface of the G3 lens 615, projecting from the lens holder 700, is able to enter the inside of the opening 702j of the infrared LED holder 702. In other words, part of the opening 702j of the infrared LED holder 702 and part of the G3 lens 615 located at the rearmost end side (most photographer side) among the EVF lens group 616 of the viewfinder unit 900 are located in a selected one plane orthogonal to the EVF optical axis.

In addition, the infrared LEDs 618, 619, 622, 623, 624, 625, 626, 627 are also placed so as to overlap part of the G3 lens 615 in a plane orthogonal to the EVF optical axis direction. In other words, in the plane orthogonal to the EVF optical axis direction, the opening 702j of the infrared LED holder 702, the infrared LEDs, and the G3 lens 615 are located at positions that overlap one another. With this configuration, part of the EVF lens group 616 and the infrared LED holder 702 (and the infrared LEDs) can be placed at positions that do not overlap one another in the EVF optical axis direction, so it is possible to suppress an increase in the size of the viewfinder unit 900 in the EVF optical axis direction.

With the above-described configuration, in the XY-plane direction (direction orthogonal to the EVF optical axis) shown in FIG. 20, the infrared LED plate 701, the infrared LED holder 702, and the infrared LEDs can be placed in the area Z (diagonally shaded area) in the drawing. Here, the area Z in the drawing is an area between the rearmost end of the outline of the lens holder 700 and the rearmost end of the outline of the G3 lens 615 in the EVF optical axis direction and surrounded by the outline of the G3 lens 615, protruding from the rearmost end of the lens holder 700, and the outline of the lens holder 700. Since part of the infrared LED holding member (701, 702) and part of each of the infrared LEDs are included in this area, it is possible to prevent an increase in the size of the viewfinder unit 900 in the EVF optical axis direction. FIG. 20 shows the location of the area Z in a selected sectional view. The area Z surrounds the outer periphery of the G3 lens 615.

Figure 13A:
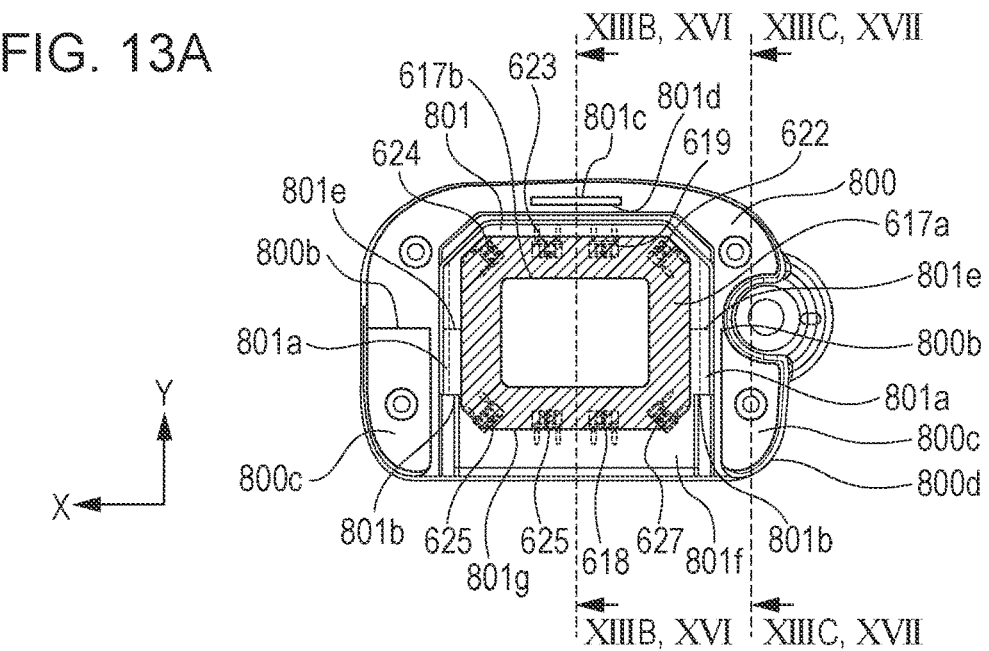
FIG. 13A is a back side view of an eyepiece cover according to the embodiment of the present disclosure.

As shown in FIG. 13A (described later), the opening of the eyepiece frame 801 is enlarged to a necessary size or above for the display size of the EVF module 29. The infrared LEDs 618, 619, 622, 623, 624, 625, 626, 627 are placed inside the opening of the eyepiece frame 801 in an XY-plane parallel to the EVF optical axis. More specifically, when the viewfinder unit 900 is viewed in the EVF optical axis direction, the infrared LEDs are placed in an area inside the above-described opening 702j and outside the display area of the EVF module 29. With this configuration, the distance in the EVF optical axis direction between the eyepiece frame 801 and the infrared LEDs 618, 619, 622, 623, 624, 625, 626, 627 can be minimized.

With the above-described configuration, the distance between the G3 lens 615 and the eyepiece window 617 and, in addition, the distance between the G3 lens 615 and the eyepiece frame 801, are reduced, so it is possible to suppress an increase in the size of the viewfinder unit 900 while including the components used to detect a line of sight. As a result, the viewfinder unit 900 is able to ensure the long distance between the eyepiece frame 801 and an eyepoint position (EP) at which the content of the display of the display panel unit 8 can be optically viewed. Therefore, an optical apparatus that suppresses vignetting of the content of the display and that is suitable for looking in while downsizing the unit as the viewfinder unit 900 according to the embodiment of the present disclosure.

When the eyepiece lens is not configured to be movable, the eyepiece window 617 does not need to be provided when the infrared LED holder 702 is made of a resin or the like that effectively transmits an infrared wavelength. In this case, the dimension of the viewfinder unit 900 in the EVF optical axis direction can be further reduced, so the infrared LED plate 701 may be configured to be integrally formed with the lens holder 700.

Description of Line-of-Sight Detection Operation

A line-of-sight detection method will be described with reference to FIGS. 10 to 12.

Figure 10:
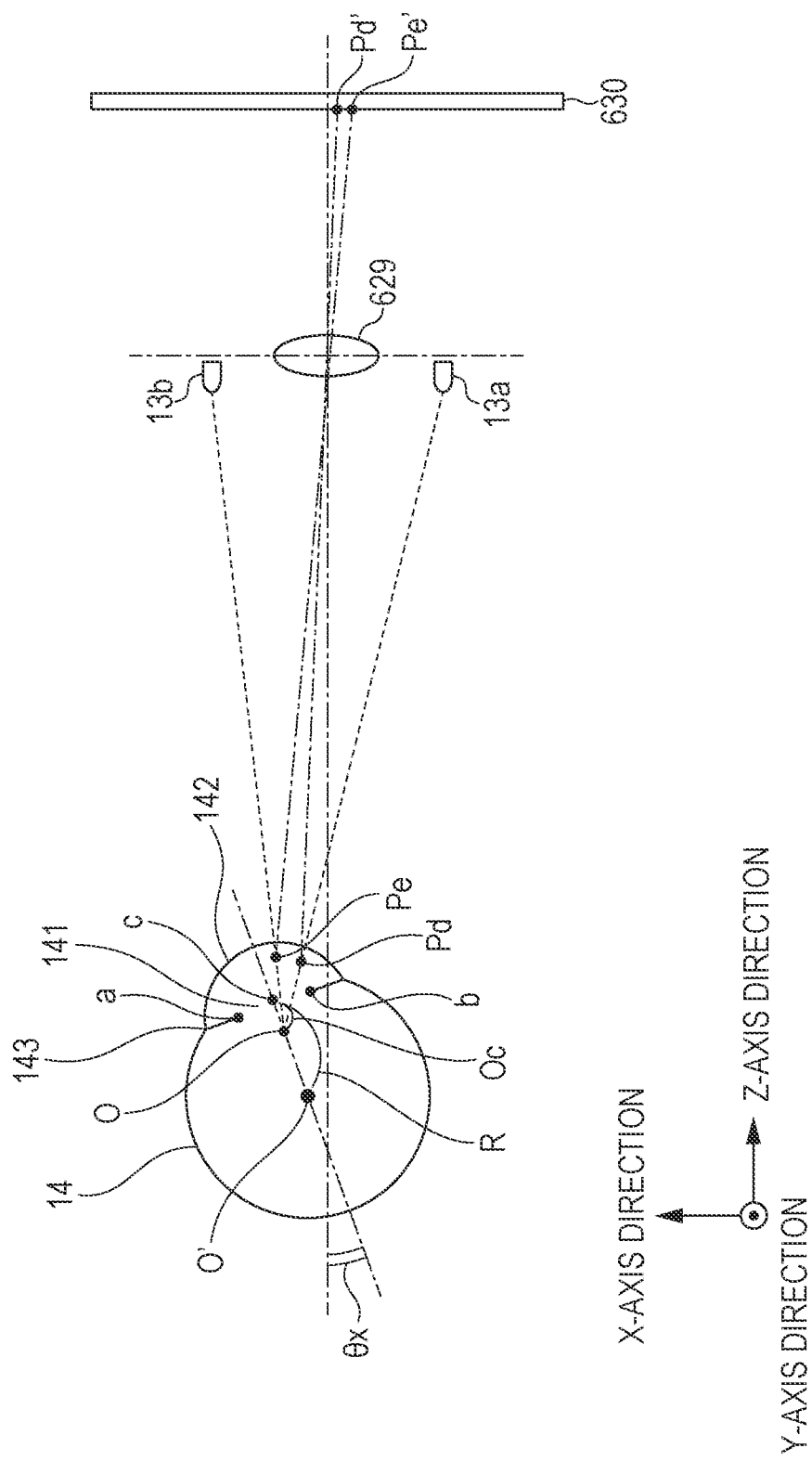
FIG. 10 is a diagram for illustrating the principle of a line-of-sight detection method according to the embodiment of the present disclosure.

FIG. 10 is a diagram for illustrating the principle of the line-of-sight detection method and is a schematic diagram of the optical system for detecting a line of sight. As shown in FIG. 10, light sources 13a, 13b are placed substantially symmetrically with respect to the optical axis of the line-of-sight image-forming lens 629 and illuminate a user's eyeball 14. Part of light emitted from the light sources 13a, 13b and reflected on the eyeball 14 converges on the line-of-sight sensor 630 by the line-of-sight image-forming lens 629.

Figure 11A:
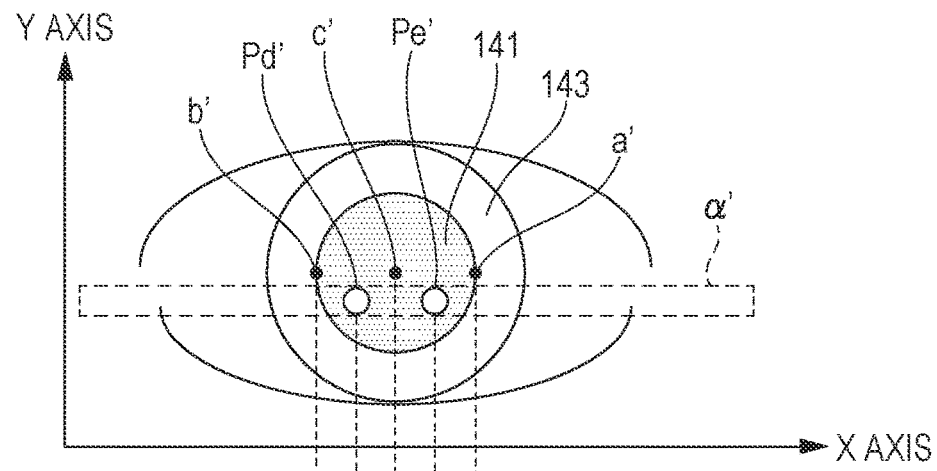
FIG. 11A is a schematic view of an eye image picked up by a line-of-sight sensor (an eyeball image projected on the line-of-sight sensor) according to the embodiment of the present disclosure.
Figure 11B:
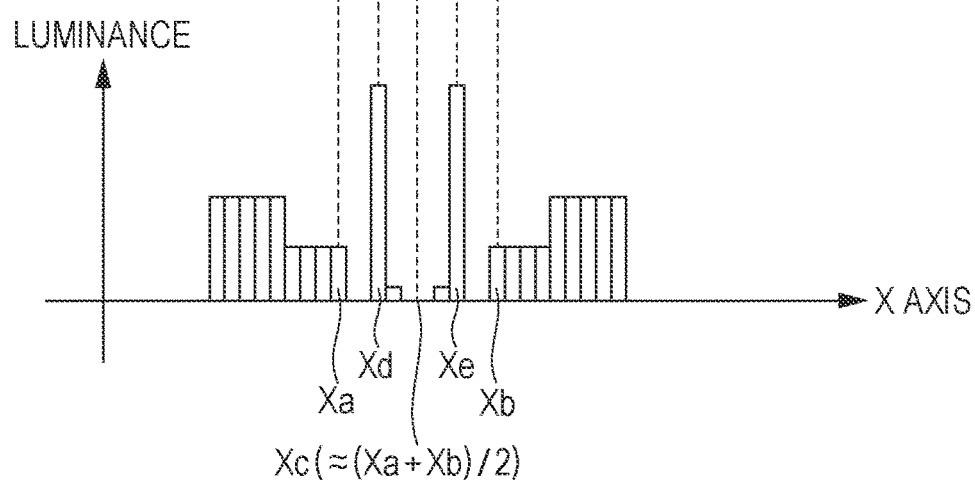
FIG. 11B is a graph showing an output distribution in the line-of-sight sensor.

FIG. 11A is a schematic view of an eye image picked up by the line-of-sight sensor 630 (an eyeball image projected on the line-of-sight sensor 630) according to the embodiment. FIG. 11B is a graph showing an output distribution in the line-of-sight sensor 630.

FIG. 12 is a schematic flowchart of the line-of-sight detection operation and shows a process executed by the system control unit 50 running a computer program stored in the memory.

When the line-of-sight detection operation in the system control unit 50 starts, the light sources 13a, 13b emit infrared light toward the user's eyeball 14 in step S801 of FIG. 12. The eyeball image of the user illuminated by infrared light is formed on the line-of-sight sensor 630 through the line-of-sight image-forming lens 629 and photoelectrically converted by the line-of-sight sensor 630. Thus, a processable electrical signal of the eye image is obtained.

In step S802, a line-of-sight detection circuit 201 transmits the eye image (eye image signal; the electrical signal of the eye image) obtained from the line-of-sight sensor 630 to the system control unit 50. In step S803, the system control unit 50 obtains the coordinates of points corresponding to corneal reflection images Pd', Pe' and a pupil center image c' of the light sources 13a, 13b, shown in FIG. 11A, from the eye image obtained in step S802.

As shown in FIG. 10, infrared light emitted from the light sources 13a, 13b illuminates the cornea 142 of the user's eyeball 14. At this time, corneal reflection images Pd, Pe formed by part of the infrared light, reflected on the surface of the cornea 142, are condensed by the line-of-sight image-forming lens 629 and formed on the line-of-sight sensor 630 into the corneal reflection images Pd', Pe' in the eye image of FIG. 11A.

Similarly, light fluxes from the edges a, b of the pupil 141 are also formed on the line-of-sight sensor 630 into pupil edge images a', b' in the eye image as shown in FIG. 11A.

FIG. 11B shows luminance information (luminance distribution) of an area α' in the eye image of FIG. 11A. In FIG. 11B, the X-axis direction represents the horizontal direction of the eye image, the Y-axis direction represents luminance, and the graph shows the luminance distribution in the X-axis direction. In the present embodiment, the coordinates of the corneal reflection images Pd', Pe' in the X-axis direction (horizontal direction) are respectively denoted by Xd, Xe, and the coordinates of the pupil edge images a', b' in the X-axis direction are respectively denoted by Xa, Xb. As shown in FIG. 11B, extremely high-level luminances are obtained at the coordinates Xd, Xe of the corneal reflection images Pd', Pe'.

In the range from the coordinate Xa to the coordinate Xb, which corresponds to the area of the pupil 141 (the area of a pupil image that a light flux from the pupil 141 forms on the line-of-sight sensor 630), extremely low-level luminances are obtained except the coordinates Xd, Xe. In the area of an iris 143 outside the pupil 141 (the area of an iris image outside the pupil image, that a light flux from the iris 143 forms), an intermediate luminance between the above two types of luminances is obtained. Specifically, an intermediate luminance between the two types of luminances is obtained in an area where the X coordinate (coordinate in the X-axis direction) is less than the coordinate Xa and an area where the X coordinate is greater than the coordinate Xb.

From the luminance distribution shown in FIG. 11B, the X coordinates Xd, Xe of the corneal reflection images Pd', Pe' and the X coordinates Xa, Xb of the pupil edge images a', b' can be obtained. Specifically, coordinates at which luminances are extremely high can be obtained as the coordinates of the corneal reflection images Pd', Pe', and coordinates of edge parts at which the luminances are extremely low luminances can be obtained as the coordinates of the pupil edge images a', b'.

When the rotational angle θx of the optical axis of the eyeball 14 with respect to the optical axis of the line-of-sight image-forming lens 629 is small, the coordinate Xc of the pupil center image c' (the center of the pupil image) that a light flux from a pupil center c forms on the line-of-sight sensor 630 can be expressed as Xc≈(Xa+Xb)/2. In other words, the coordinate Xc of the pupil center image c' can be calculated from the X coordinates Xa, Xb of the pupil edge images a', b'.

In this way, the coordinates of the corneal reflection images Pd', Pe' and the coordinate of the pupil center image c' can be acquired.

In step S804, the system control unit 50 calculates the image-forming magnification β of the eyeball image. The image-forming magnification β is a magnification determined by the position of the eyeball 14 with respect to the line-of-sight image-forming lens 629. The image-forming magnification β can be obtained by using the function of a distance (Xe−Xd) between the corneal reflection images Pd', Pe'.

In step S805, the system control unit 50 calculates the rotational angle of the optical axis of the eyeball 14 with respect to the optical axis of the line-of-sight image-forming lens 629.

The X coordinate of the middle point of the corneal reflection image Pd and the corneal reflection image Pe substantially coincides with the X coordinate of the center of curvature O of the cornea 142. For this reason, where a standard distance from the center of curvature O of the cornea 142 to the center c of the pupil 141 is Oc, the rotational angle θx of the eyeball 14 in a ZX-plane (a plane perpendicular to the Y axis) can be calculated by the following expression 1.

$$\beta \times Oc \times \sin \theta x \approx \{(Xd+Xe)/2\}-Xc \quad (1)$$

The rotational angle θy of the eyeball 14 in a ZY-plane (a plane perpendicular to the X axis) can also be calculated by a method similar to the method of calculating the rotational angle θx.

In step S806, the system control unit 50 obtains (estimates) a user's view point (a position where the line of sight is directed; a position where the user is looking) in a visual recognition image displayed on the display unit by using the rotational angles θx, Oy calculated in step S805. Assuming that the coordinates (Hx, Hy) of the view point are coordinates corresponding to the pupil center c, the coordinates (Hx, Hy) of the view point can be calculated by the following expressions 2 and 3.

$$Hx=m\times(Ax\times\theta x+Bx) \quad (2)$$

$$Hy=m\times(Ay\times\theta y+By) \quad (3)$$

The parameter m in the expressions 2 and 3 is a constant determined in accordance with the configuration of the viewfinder optical system (the line-of-sight image-forming lens 629 and the like) of the digital camera 100 and is a conversion coefficient for converting the rotational angles θx, θy to coordinates corresponding to the pupil center c in the visual recognition image. The parameter m is determined in advance and stored in the nonvolatile memory 56.

The parameters Ax, Bx, Ay, By are line-of-sight correction parameters for correcting an individual difference in line of sight, acquired by performing calibration work (described later) for each person, and stored in the nonvolatile memory 56 before the line-of-sight detection operation starts.

In step S807, the system control unit 50 stores the coordinates (Hx, Hy) of the view point in the nonvolatile memory 56 and ends the line-of-sight detection operation.

Configuration of Eyecup and Others

Figure 13B:
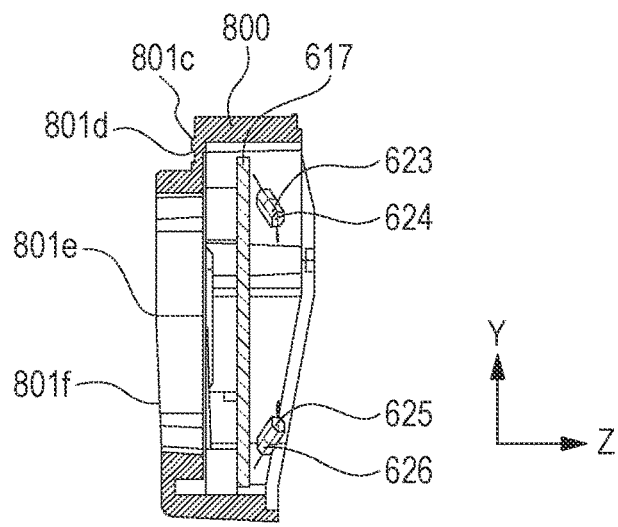
FIGS. 13B and 13C are sectional views of the eyepiece cover according to the embodiment of the present disclosure.
Figure 13C:
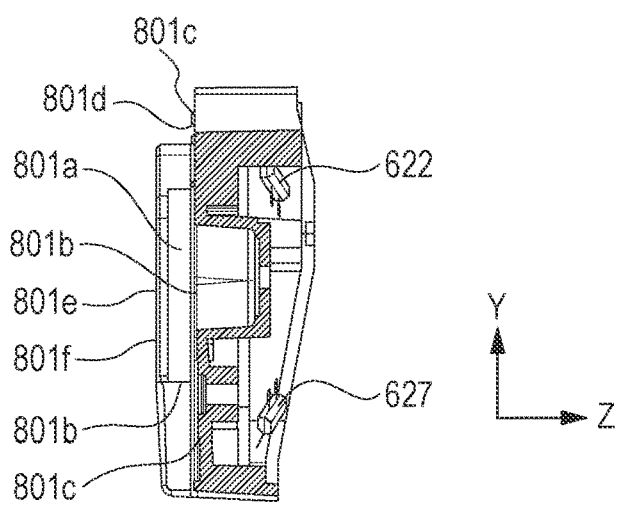
Figure 14A:
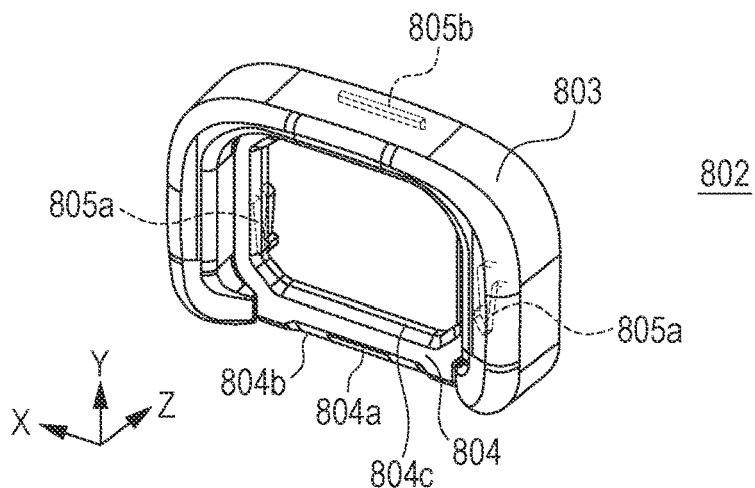
FIGS. 14A, 14B, and 14C are perspective views exemplarily illustrating an eyecup according to the embodiment of the present disclosure.

FIG. 13A is a back side view of the eyepiece cover 800 to which the eyecup is attached according to the embodiment of the present disclosure. FIGS. 13B and 13C are respectively sectional views taken along the line XIIIB-XIIIB and the line XIIIC-XIIIC in FIG. 13A. All the drawing show a state where the eyecup 802 shown in FIG. 14A is removed. The eyepiece frame 801 is integrally formed with the eyepiece cover 800. In order for the opening 801g of the eyepiece frame 801 not to interfere with light fluxes of the infrared LEDs 618, 619, 622, 623, 624, 625, 626, 627 for line-of-sight detection, the opening 801g of the eyepiece frame 801 is configured to be wider by a part indicated by the diagonally shaded lines than the viewfinder opening 617b needed when no line-of-sight detection function is provided.

Eyepiece frame grooves 801a extending in the Y direction for attaching various eyepiece accessories including the eyecup 802 according to the present embodiment are respectively provided at both sides of the eyepiece frame 801. The eyecup 802 is detachably attachable to the eyepiece frame 801 by sliding along the eyepiece frame grooves 801a. The eyepiece frame grooves 801a are respectively provided at both sides of the eyepiece frame 801 in the present embodiment. Alternatively, the eyepiece frame groove 801a can be provided at least one end.

Not only the eyecup 802 serving as an attachment unit can be attached to and detached from the eyepiece portion 16 according to the present embodiment but also, for example, a magnifier, an angle finder, or the like can be attached to the eyepiece portion 16. In other words, the attachment unit includes at least one of an eyecup, a magnifier, and an angle finder.

Eyepiece frame steps 801b are respectively formed at the inner lower ends of the eyepiece frame grooves 801a.

An eyepiece frame projection 801c as shown in FIGS. 13A to 13C is provided in the eyepiece frame 801 on the upper side of the viewfinder opening 617b to prevent the eyecup 802 from unintentionally dropping off. As shown in the sectional view of FIG. 13B, the lower surface of the eyepiece frame projection 801c is an eyepiece frame right-angled wall (first wall) 801d at substantially right angles with respect to a direction to remove the eyecup 802 (Y direction).

Therefore, even when a force in the Y direction acts on the eyecup 802 in a state where the eyecup 802 is engaged with the eyepiece frame projection 801c, the eyecup 802 is difficult to drop off. The upper surface of the eyepiece frame projection 801c can be not at right angles with respect to the Y direction but inclined with respect to the Y direction.

An eyepiece frame inclined portion 801f is provided from eyepiece frame inclination start points 801e in the eyepiece frame 801. Eyepiece cover inclined portions 800c are similarly provided from eyepiece cover inclination start points 800b in the eyepiece cover 800. In other words, in the eyepiece frame 801, the lower-side surface is inclined with respect to the upper-side surface in the drawing with respect to the eyepiece frame inclination start points 801e as a boundary as shown in FIG. 13B.

By relatively inclining the upper-side surface and the lower-side surface on both sides of the eyepiece frame inclination start points 801e and the eyepiece cover inclination start points 800b, the eyepiece frame inclination start points 801e and the eyepiece cover inclination start points 800b relatively form protrusions. When the upper-side surface and the lower-side surface on both sides of each of the eyepiece frame inclination start points 801e and the eyepiece cover inclination start points 800b are not relatively inclined, the eyepiece frame inclination start points 801e and the eyepiece cover inclination start points 800b can be formed as protrusions.

An edge 800d at the outer periphery of the eyepiece cover 800 is not inclined. In a state where the attachment unit is attached, the entire edge portion 803a (see FIG. 14B) of an eyecup rubber 803 (described later) is configured to contact with the edge 800d at the outer periphery of the eyepiece cover 800.

Thus, an eyecup body 805 can be inclined while the edge 800d at the outer periphery of the eyepiece cover 800 and the edge portion 803a of the eyecup rubber 803 serving as an elastic member are maintained in an elastically contact state. In other words, by adding a force to the eyecup body 805, an eyecup bottom 805d (FIG. 14B) can be inclined to a position substantially parallel to the eyepiece frame inclined portion 801f and the eyepiece cover inclined portions 800c.

Therefore, with the elastic force of the edge portion 803a of the eyecup rubber 803, the eyecup 802 can be held in a right position without rattling in a state where the eyecup 802 is attached.

Next, the configuration of the eyecup 802 according to the present embodiment will be described with reference to FIGS. 14A, 14B, and 14C.

FIG. 14A is a perspective view showing a major portion of the eyecup 802 according to the embodiment. FIG. 14B is a perspective view of the eyecup 802 from the back side. FIG. 14C is an exploded perspective view of the eyecup 802. All the drawings show a state where the eyecup 802 is not attached to a camera body. As shown in FIG. 14C, the eyecup 802 according to the present embodiment is made up of the eyecup rubber 803, an eyecup cover 804 having an eyepiece field frame 804c, and the eyecup body 805.

As in the case of the above, in order for the eyepiece field frame 804c not to interfere with light fluxes of the infrared LEDs 618, 619, 622, 623, 624, 625, 626, 627 for line-of-sight detection, the eyepiece field frame 804c is configured to be wider than the viewfinder opening 617b needed when no line-of-sight detection function is provided.

The eyecup body 805 includes eyecup pawls 805a, an eyecup groove 805b, and the eyecup bottom 805d. When the eyecup 802 is attached to the eyepiece frame 801, the eyecup pawls 805a get caught by the lower ends of the eyepiece frame steps 801b, with the result that it is possible to prevent the eyecup 802 from unintentionally dropping off.

Here, the eyecup pawls 805a function as pawls that are able to engage with the steps at the time when the attachment unit is attached along the eyepiece frame grooves 801a. The eyecup groove 805b functions as a recess that engages with the eyepiece frame projection 801c when the attachment unit is attached to the eyepiece frame 801.

The eyecup rubber 803 is configured to project from the eyecup body 805. This is to make a user feel better when the user looks into the viewfinder and to block entry of light into the viewfinder through a gap between the eyecup and the area around the eye of the user. The inside of the projection of the eyecup rubber 803 is hollow, so it is possible to provide a soft feel.

An index portion 804a serving as a pressing portion to be pushed at the time when the user intentionally removes the eyecup 802 from the eyepiece frame 801 is provided in the eyecup cover 804. An inclined surface 804b is provided such that a force acts in the Z direction and the Y direction in FIG. 16B when the user pushes the index portion 804a.

Figure 14B:
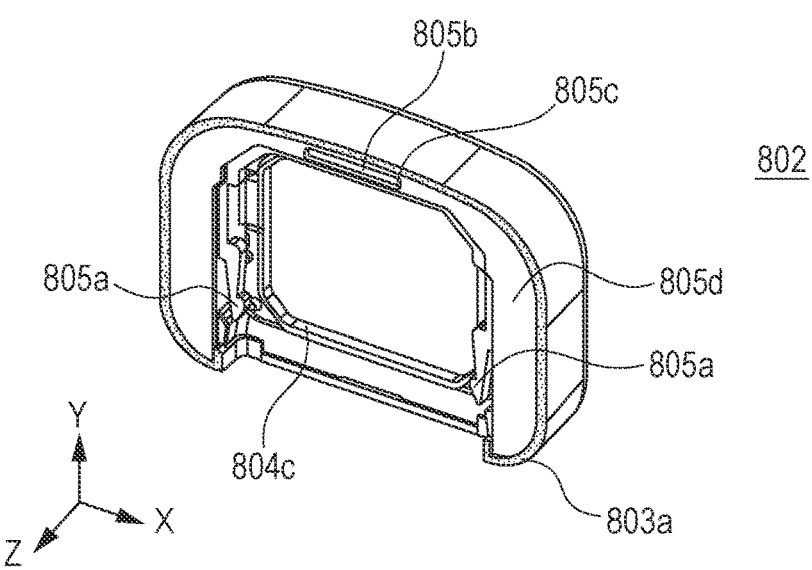
Figure 14C:
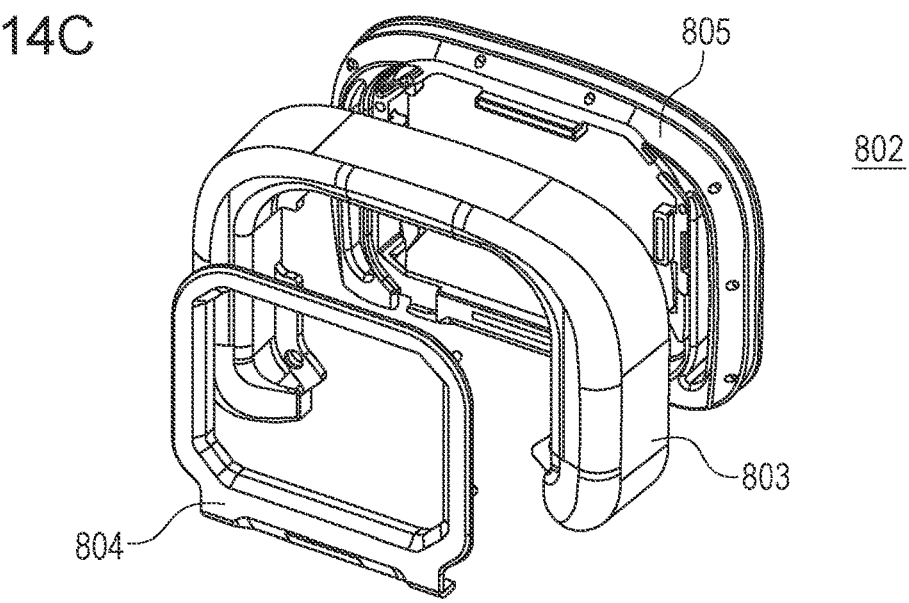

The eyecup cover 804 is fixedly bonded to the eyecup body 805 together with the eyecup rubber 803, and, as shown in FIG. 14B, the edge portion 803a at the outer periphery of the eyecup rubber 803 is exposed at the outer peripheral portion of the eyepiece when viewed from the back side. When the eyecup 802 is attached to the eyepiece frame 801, the eyepiece frame projection 801c at the upper part of the eyepiece frame 801 is inserted in the eyecup groove 805b of the eyecup 802.

When a force acts in a direction in which the eyecup 802 drops off from the eyepiece frame 801 (upward direction opposite to the downward arrow R in FIG. 15), the eyepiece frame right-angled wall (first wall) 801d of the eyepiece frame projection 801c gets caught by an inner wall 805c on the lower side of the eyecup groove (recess) 805b. Thus, it is possible to further prevent the eyecup 802 from unintentionally dropping off. Here, the inner wall 805c is provided in the recess, and functions as a second wall that contacts with the first wall when a force acts on the attachment unit in a direction to remove the attachment unit.

Attaching of Eyecup

Next, the operation at the time when the eyecup 802 is attached to the eyepiece frame 801 formed in the camera body will be described with reference to FIGS. 15, 16A, 16B, 17A, and 17B.

FIGS. 15, 16A, 16B, 17A, and 17B are sectional views showing the detailed configuration of the eyecup and the eyepiece frame according to the embodiment and each show a state where the eyecup 802 is attached to the eyepiece frame 801.

Figure 15:
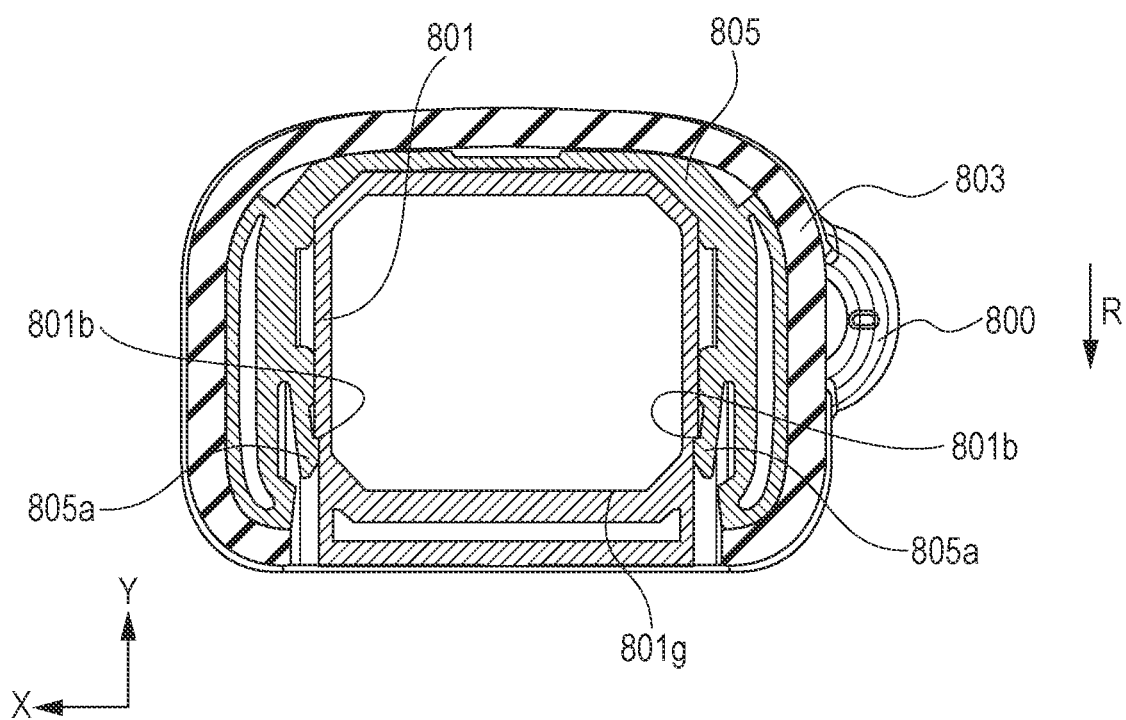
FIG. 15 is a sectional view, perpendicular to a Z direction, of a part where pawls are engaged in a state where the eyecup is attached to an eyepiece frame according to the embodiment.

More specifically, FIG. 15 is a sectional view, perpendicular to the Z direction, of a part where the pawls are engaged in a state where the eyecup 802 is attached to the eyepiece frame 801.

Figure 16A:
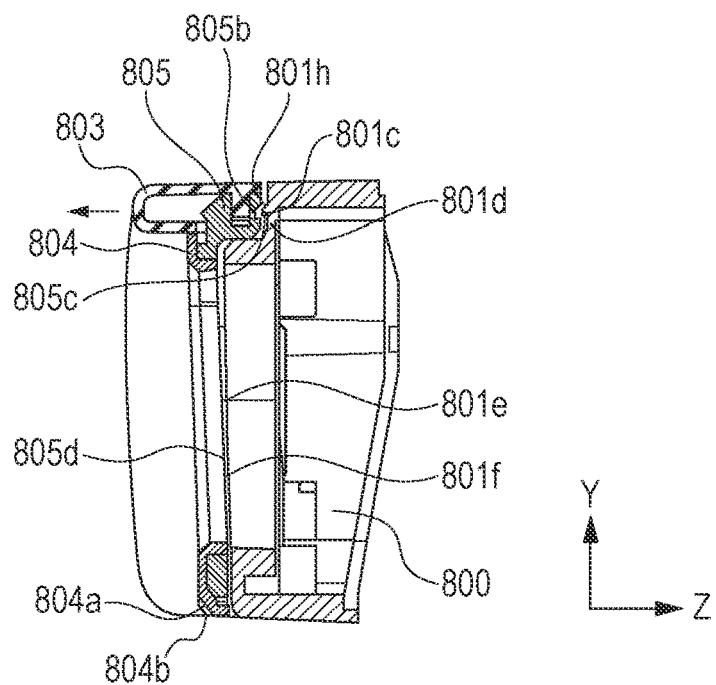
FIG. 16A is a sectional view in a state where an eyepiece frame projection is disengaged from an eyecup groove according to the embodiment of the present disclosure.
Figure 16B:
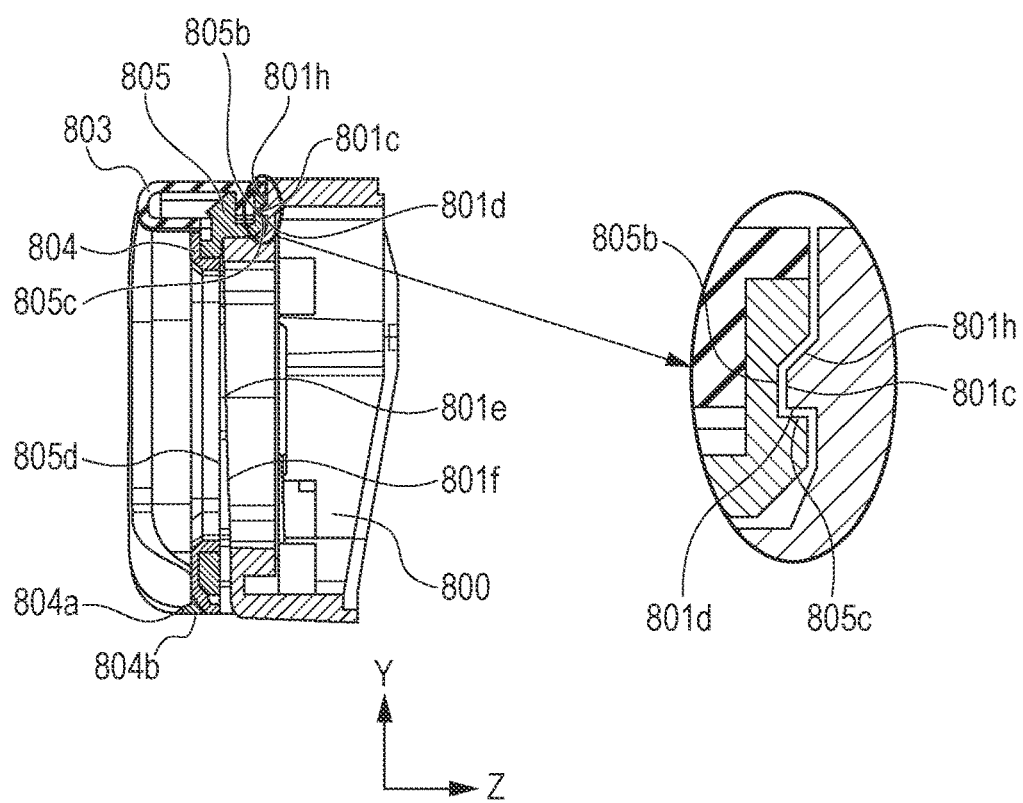
FIG. 16B is a sectional view in an eyecup attachment state according to the embodiment of the present disclosure.

FIG. 16A is a sectional view taken along the line XVI-XVI in FIG. 13A in a state where the eyepiece frame projection 801c and the eyecup groove 805b are disengaged according to the embodiment. FIG. 16B is a sectional view taken along the line XVI-XVI in FIG. 13A in an eyecup attachment state according to the embodiment.

Figure 17A:
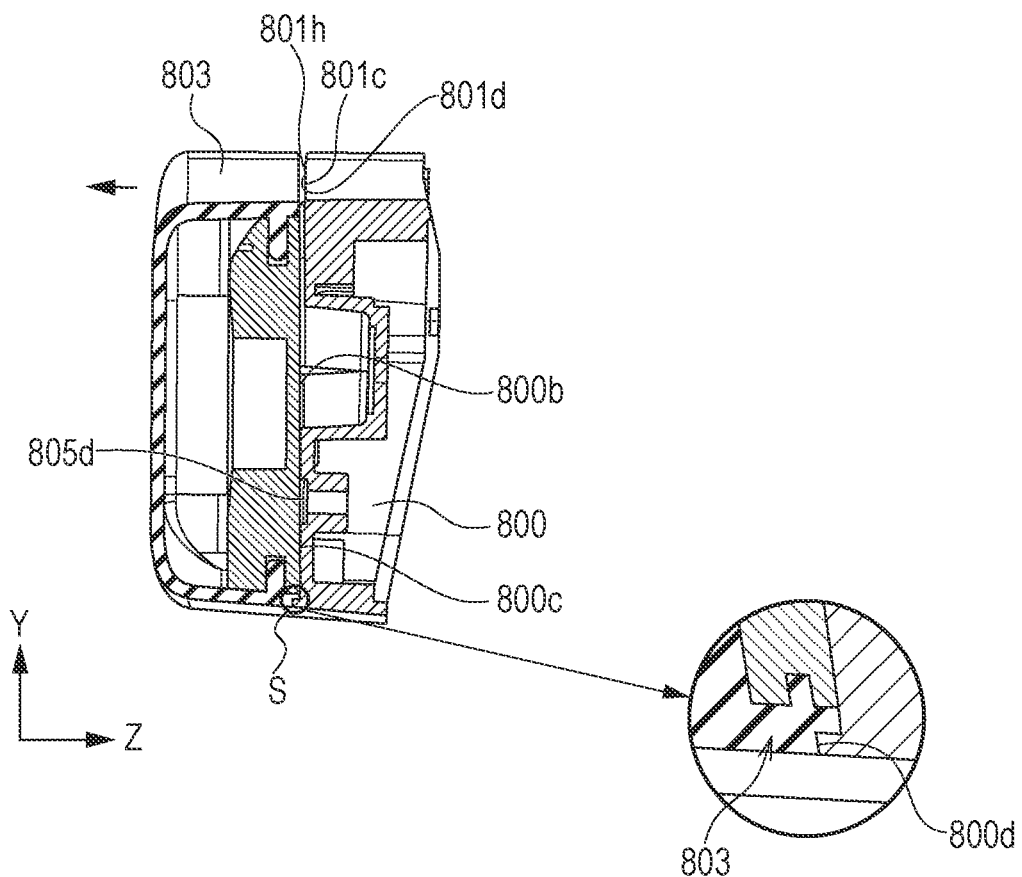
FIG. 17A is a sectional view in a state where the eyepiece frame projection is disengaged from the eyecup groove according to the embodiment of the present disclosure.
Figure 17B:
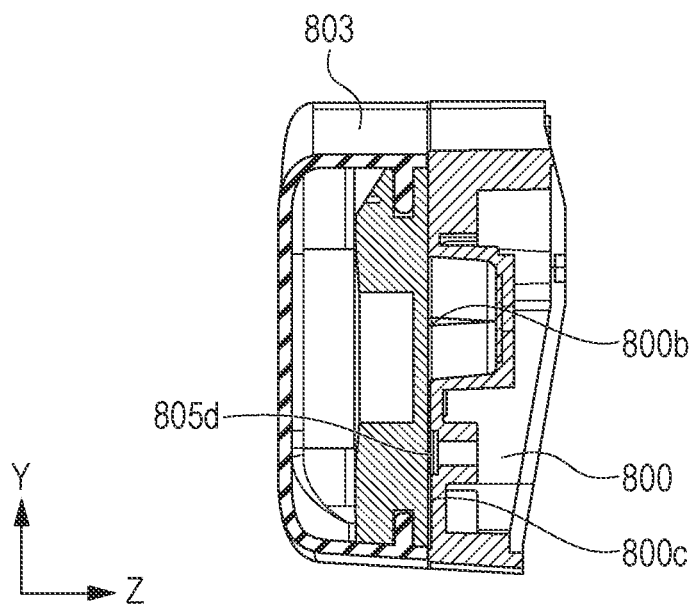
FIG. 17B is a sectional view in the eyecup attachment state according to the embodiment of the present disclosure.

FIG. 17A is a sectional view taken along the line XVII-XVII in FIG. 13A in a state where the eyepiece frame projection 801c and the eyecup groove 805b are disengaged. FIG. 17B is a sectional view taken along the line XVII-XVII in FIG. 13A in the eyecup attachment state.

A user inserts the eyecup 802 in the arrow R direction in FIG. 15 while sliding the eyecup pawls 805a along the eyepiece frame grooves 801a formed in the eyepiece frame 801. After that, the eyecup 802 is inserted in a state where the eyecup pawls 805a are elastically deformed and pushed outward. Then, the eyecup pawls 805a drop onto the eyepiece frame steps 801b of the eyepiece frame 801 to be engaged.

In addition to the above, with the insertion operation in the arrow R direction of FIG. 15, the eyecup body 805 is lifted by a projection inclined surface 801h of the eyepiece frame projection 801c as shown in FIG. 16A, and the eyepiece frame projection 801c and the eyecup groove 805b are not engaged and get caught by each other.

At this time, as shown at portion S in FIG. 17A, the eyecup rubber 803 serving as an elastic member, which is in contact with the edges 800d of the inclined portions 800c of the eyepiece cover 800, is pressed in the Z direction to be elastically deformed and compressed. As a result, in FIG. 16A, the eyecup bottom 805d inclines in the Z direction to a position substantially parallel to the eyepiece frame inclined portion 801f and the eyepiece cover inclined portions 800c. As a result, the eyecup 802 is able to climb over the eyepiece frame projection 801c, and the eyepiece frame projection 801c drops into the eyecup groove 805b to be engaged. In other words, the state shifts from the state of FIG. 16A to the state of FIG. 16B.

Removing of Eyecup

Next, the case where the eyecup 802 is removed from the eyepiece frame 801 will be described.

At the time when the eyecup 802 is removed from the eyepiece frame 801, the operation works as follows. By pushing the eyecup cover index portion 804a shown in FIG. 14A, a force acts on the eyecup 802 in the Z direction and the Y direction by the inclined surface 804b. With the force in the Z direction, as shown in FIG. 17A, the eyecup rubber 803 in contact with the edges 800d of the inclined portions 800c of the eyepiece cover 800 is elastically deformed and compressed.

As a result, the eyecup bottom 805d rotates in the Z direction until the eyecup bottom 805d is parallel to the eyepiece cover inclined portions 800c and the eyepiece frame inclined portion 801f, with the result that the eyepiece frame projection 801c and the eyecup groove 805b are disengaged. In other words, the state shifts from the state of FIGS. 16B and 17B to the state of FIGS. 16A and 17A. With the force in the Y direction generated by pushing the eyecup cover index portion 804a, the eyecup pawls 805a are elastically deformed outward in FIG. 15, with the result that the eyecup pawls 805a and the eyepiece frame steps 801b are disengaged.

In this way, the eyepiece frame inclination start points 801e and the eyepiece cover inclination start points 800b function as protrusions that allow the attachment unit to rotate when the attachment unit is pressed against the eyepiece frame 801.

The eyecup groove 805b serving as the recess is configured to leave from the eyepiece frame projection 801c at the time when the attachment unit rotates in the Z direction on the protrusions as fulcrums.

When the eyecup 802 is further pushed up in the Y direction in a state where the eyecup pawls 805a and the eyepiece frame steps 801b are disengaged, a user is able to easily remove the eyecup 802.

In this way, in the present embodiment, the eyecup cover index portion 804a has the inclined surface 804b such that a force acts in the Z direction and the Y direction at the same time, so a user is able to remove the eyecup 802 with a simple one operation.

When Unintentional Force Acts in Removing Direction

Next, the case where the eyecup cover index portion 804a is not operated and an unintentional force acts in a direction to remove the eyecup 802 will be described.

When, for example, the camera body is put in a camera bag, a force may act in a direction to remove the eyecup 802 against a user's intention. However, in the attachment state (the state of FIG. 16B), the eyepiece frame right-angled wall 801d in the Z direction of the eyepiece frame projection 801c and the inner wall 805c on the lower side of the eyecup groove 805b get caught by each other, so it is possible to prevent the eyecup 802 from dropping off against a user's intention.

In the present embodiment, in order to remove the eyecup 802, the eyecup rubber 803 needs to be compressed and deformed by pushing the eyecup cover index portion 804a. Then, the eyepiece frame projection 801c needs to be removed from the eyecup groove 805b by rotating the eyecup bottom 805d in the Z direction to a position substantially parallel to the eyepiece cover inclined portions 800c and the eyepiece frame inclined portion 801f.

Therefore, even when, for example, the camera is put in a camera bag or taken out the camera from the camera bag or a user moves while hanging the camera from the neck or the shoulder with a strap, the eyecup 802 does not drop off. Since the eyecup rubber 803 projects beyond the eyecup body 805 and the projection has a hollow space inside and is soft, even when the eyecup rubber 803 is pushed in the Z direction, the force is difficult to be transmitted to the eyecup body 805. In other words, even when a force acts on the eyecup rubber 803, the force is difficult to act in a direction in which the eyepiece frame projection 801c is disengaged from the eyecup groove 805b.

To apply a force in a direction in which the eyepiece frame projection 801c is disengaged from the eyecup groove 805b, an area around the index portion 804a of the eyecup cover 804 needs to be pushed. When a force acts on a location other than that, the force acts in a direction in which the eyepiece frame projection 801c is difficult to be disengaged from the eyecup groove 805b, so the configuration makes it difficult for the eyepiece frame projection 801c to be disengaged.

As described above, according to the present embodiment, the eyecup cover index portion 804a needs to be pushed in order for a user to remove the eyecup 802 from the eyepiece frame 801 formed in the camera body. As a result, the eyecup rubber 803 is elastically deformed, the eyecup bottom 805d rotates in the Z direction to a position substantially parallel to the eyepiece cover inclined portions 800c and the eyepiece frame inclined portion 801f, and the eyepiece frame projection 801c is disengaged from the eyecup groove 805b. Then, the eyecup pawls 805a are elastically deformed, the eyecup pawls 805a retract from the eyepiece frame steps 801b, and a user is able to easily remove the eyecup 802.

On the other hand, when the eyecup cover index portion 804a is not operated and an unintentional force acts in a direction to remove the eyecup 802 from the eyepiece frame 801, the eyepiece frame right-angled wall 801d of the eyepiece frame projection 801c and the inner wall 805c on the lower side of the eyecup groove 805b get caught by each other. Therefore, the eyecup 802 does not drop off against a user's intention.

In addition, no operation unit for actuating pawls or no movable pawl mechanism are needed in the eyecup body, so the size of the eyecup 802 can be reduced. Furthermore, since the direction to operate the index portion 804a and the removing direction coincide with each other, two or more step operations, that is, the operation unit is operated and then the eyecup is lifted in the removing direction, is not needed. Therefore, a user is able to easily remove the eyecup 802 with a single operation, that is, pushing the eyecup cover index portion 804a.

The present disclosure has been described in detail in accordance with the example embodiment. The present disclosure is not limited to the above-described embodiment. Various modifications are possible in accordance with the purport of the present disclosure, and those are not intended to be excluded from the scope of the present disclosure. For example, in the above-described embodiment, the configuration in which the line-of-sight sensor 630 picks up a photographer's eyeball image entering through the EVF lens group 616 has been described; however, the configuration is not limited thereto. A sensor for detecting the line of sight of a photographer may be capable of picking up a photographer's eyeball image outside the EVF optical axis of the viewfinder unit 900. For example, a line-of-sight sensor may be placed near the above-described opening 702j (that is, near the infrared LEDs).

In the above-described embodiment, the case where the G3 lens 615 is a convex lens has been described; however, the configuration is not limited thereto. Another configuration may be adopted as the lens configuration of the EVF lens group 616. For example, the G3 lens 615 may be a concave lens. Whether the EVF lens group 616 is movable is not limited to the content of the above-described embodiment. The EVF lens group 616 may be configured to not move in the EVF optical axis direction and be fixed to the lens holder 700.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-016296 filed Feb. 4, 2021 and No. 2021-106529 filed Jun. 28, 2021, which are hereby incorporated by reference herein in their entirety.

What is claimed is:

1. A viewfinder unit comprising:
a display unit capable of displaying an image;
an eyepiece portion;
a lens provided between the display unit and the eyepiece portion;
a first holder configured to hold the lens in a direction orthogonal to an optical axis of the lens;
an illumination device configured to illuminate an eye of a photographer with a predetermined light;
a second holder configured to hold the illumination device;
a sensor capable of picking up an image of the eye of the photographer, illuminated by the illumination device with the predetermined light, to detect a line of sight of the photographer; and
an opening provided in the eyepiece portion, wherein the opening is wider than a display area of the display unit when viewed in an optical axis direction of the lens,
wherein, when the eyepiece portion is viewed in the optical axis direction, the illumination device is located inside the opening and outside the display area of the display unit,
wherein part of a first area of the lens, projecting from an outline of the first holder in the optical axis direction, is located inside the opening in the direction orthogonal to the optical axis, and
wherein at least one of the illumination device and the second holder is located in a second area where the second area is surrounded by the outline of the first holder and the first area of the lens.

2. The viewfinder unit according to claim 1, wherein the lens is included in an optical system and is a lens with a convex shape toward the photographer.

3. The viewfinder unit according to claim 1,
wherein the lens is movable in the optical axis direction, and
wherein, in a state where the lens is located closest to the photographer, the lens is located inside the opening in the direction orthogonal to the optical axis.

4. The viewfinder unit according to claim 1, wherein the illumination device overlaps part of the lens in a plane orthogonal to the optical axis.

5. The viewfinder unit according to claim 1,
wherein the display area of the display unit is rectangular, and
wherein the illumination device includes a plurality of illumination portions respectively located along long sides of the rectangular display area of the display unit and capable of applying the predetermined light.

6. The viewfinder unit according to claim 1, wherein the illumination device is capable of applying light in an infrared wavelength range as the predetermined light.

7. The viewfinder unit according to claim 1, further comprising:
at least one groove provided at least at one end of the eyepiece portion for making an attachment unit detachable from the viewfinder unit, wherein the attachment unit is able to contact with a neighborhood of the eye of the photographer when the photographer visually recognizes an image displayed in the viewfinder unit; and
a projection formed on the eyepiece portion and having a first wall at substantially right angles with respect to a direction in which the attachment unit is removed along the at least one groove,
wherein the projection is engageable with a recess provided in the attachment unit in a state where the attachment unit is attached to the eyepiece portion, and
wherein the first wall contacts with a second wall provided in the attachment unit when a force is added to the attachment unit in a direction to remove the attachment unit attached to the eyepiece portion.

8. The viewfinder unit according to claim 7, further comprising a step provided inside the eyepiece portion,
wherein the step engages with a pawl provided in the attachment unit when the attachment unit is attached along the at least one groove.

9. The viewfinder unit according to claim 7,
wherein the eyepiece portion has a protrusion with which the attachment unit is rotatable when the attachment unit is pressed against the eyepiece portion, and
wherein the recess leaves from the projection formed on the eyepiece portion as the attachment unit is rotated.

10. The viewfinder unit according to claim 9, wherein the projection formed on the eyepiece portion is provided outside the opening with respect to the optical axis.

11. The viewfinder unit according to claim 10, further comprising a pressing portion configured to be used to press the attachment unit to a position below the protrusion of the eyepiece portion,
 wherein the attachment unit is configured to rotate toward the position below the protrusion when the pressing portion is pressed.

12. A viewfinder unit comprising:
 a display unit capable of displaying an image;
 an eyepiece portion;
 a lens provided between the display unit and the eyepiece portion;
 a first holder configured to hold the lens in a direction orthogonal to an optical axis of the lens;
 an illumination device configured to illuminate an eye of a photographer with a predetermined light;
 a sensor capable of picking up an image of the eye of the photographer, illuminated by the illumination device with the predetermined light, to detect a line of sight of the photographer; and
 an opening provided in the eyepiece portion, wherein the opening is wider than a display area of the display unit when viewed in an optical axis direction of the lens,
 wherein, when the eyepiece portion is viewed in the optical axis direction, the illumination device is located inside the opening and outside the display area of the display unit,
 wherein part of a first area of the lens, projecting from an outline of the first holder in the optical axis direction, is located inside the opening in the direction orthogonal to the optical axis, and
 wherein the illumination device overlaps part of the lens in a plane orthogonal to the optical axis.

13. The viewfinder unit according to claim 12, wherein the lens is included in an optical system and is a lens with a convex shape toward the photographer.

14. The viewfinder unit according to claim 12,
 wherein the lens is movable in the optical axis direction, and
 wherein, in a state where the lens is located closest to the photographer, the lens is located inside the opening in the direction orthogonal to the optical axis.

15. The viewfinder unit according to claim 12, further comprising a second holder configured to hold the illumination device such that the illumination device is oriented toward the optical axis.

16. The viewfinder unit according to claim 12,
 wherein the display area of the display unit is rectangular, and
 wherein the illumination device includes a plurality of illumination portions respectively located along long sides of the rectangular display area of the display unit and capable of applying the predetermined light.

17. The viewfinder unit according to claim 12, wherein the illumination device is capable of applying light in an infrared wavelength range as the predetermined light.

18. The viewfinder unit according to claim 12, further comprising:
 at least one groove provided at least at one end of the eyepiece portion for making an attachment unit detachable from the viewfinder unit, wherein the attachment unit is able to contact with a neighborhood of the eye of the photographer when the photographer visually recognizes an image displayed in the viewfinder unit; and
 a projection formed on the eyepiece portion and having a first wall at substantially right angles with respect to a direction in which the attachment unit is removed along the at least one groove,
 wherein the projection is engageable with a recess provided in the attachment unit in a state where the attachment unit is attached to the eyepiece portion, and
 wherein the first wall contacts with a second wall provided in the attachment unit when a force is added to the attachment unit in a direction to remove the attachment unit attached to the eyepiece portion.

19. The viewfinder unit according to claim 18, further comprising a step provided inside the eyepiece portion,
 wherein the step engages with a pawl provided in the attachment unit when the attachment unit is attached along the at least one groove.

20. The viewfinder unit according to claim 18,
 wherein the eyepiece portion has a protrusion with which the attachment unit is rotatable when the attachment unit is pressed against the eyepiece portion, and
 wherein the recess leaves from the projection formed on the eyepiece portion as the attachment unit is rotated.

21. The viewfinder unit according to claim 20, wherein the projection formed on the eyepiece portion is provided outside the opening with respect to the optical axis.

22. The viewfinder unit according to claim 21, further comprising a pressing portion configured to be used to press the attachment unit to a position below the protrusion of the eyepiece portion,
 wherein the attachment unit is configured to rotate toward the position below the protrusion when the pressing portion is pressed.

23. An image capturing apparatus comprising:
 a viewfinder unit that includes:
 a display unit capable of displaying an image,
 an eyepiece portion,
 a lens provided between the display unit and the eyepiece portion,
 a first holder configured to hold the lens in a direction orthogonal to an optical axis of the lens,
 an illumination device configured to illuminate an eye of a photographer with a predetermined light,
 a second holder configured to hold the illumination device,
 a sensor capable of picking up an image of the eye of the photographer, illuminated by the illumination device with the predetermined light, to detect a line of sight of the photographer, and
 an opening provided in the eyepiece portion, wherein the opening is wider than a display area of the display unit when viewed in an optical axis direction of the lens,
 wherein, when the eyepiece portion is viewed in the optical axis direction, the illumination device is located inside the opening and outside the display area of the display unit,
 wherein part of a first area of the lens, projecting from an outline of the first holder in the optical axis direction, is located inside the opening in the direction orthogonal to the optical axis, and
 wherein at least one of the illumination device and the second holder is located in a second area where the second area is surrounded by the outline of the first holder and the first area of the lens.

24. An image capturing apparatus comprising:
 a viewfinder unit that includes:
 a display unit capable of displaying an image,
 an eyepiece portion, a lens provided between the display unit and the eyepiece portion, a first holder configured to hold the lens in a direction orthogonal to an optical axis of the lens, an illumination device configured to illuminate an eye of a photographer with a predetermined light, a sensor capable of picking up an image of the eye of the photographer, illuminated by the illumination device with the predetermined light, to detect a line of sight of the photographer, and an opening provided in the eyepiece portion, wherein the opening is wider than a display area of the display unit when viewed in an optical axis direction of the lens, wherein, when the eyepiece portion is viewed in the optical axis direction, the illumination device is located inside the opening and outside the display area of the display unit, wherein part of a first area of the lens, projecting from an outline of the first holder in the optical axis direction, is located inside the opening in the direction orthogonal to the optical axis, and wherein the illumination device overlaps part of the lens in a plane orthogonal to the optical axis.

25. An attachment accessory detachably attachable to a viewfinder unit provided with a display unit capable of displaying an image, wherein the viewfinder unit includes:

an eyepiece portion, a lens provided between the display unit and the eyepiece portion, a first holder configured to hold the lens in a direction orthogonal to an optical axis of the lens, an illumination device configured to illuminate an eye of a photographer with a predetermined light, a second holder configured to hold the illumination device, a sensor capable of picking up an image of the eye of the photographer, illuminated by the illumination device with the predetermined light, to detect a line of sight of the photographer, and an opening provided in the eyepiece portion, wherein the opening is wider than a display area of the display unit when viewed in an optical axis direction of the lens, wherein, when the eyepiece portion is viewed in the optical axis direction, the illumination device is located inside the opening and outside the display area of the display unit, wherein part of a first area of the lens, projecting from an outline of the first holder in the optical axis direction, is located inside the opening in the direction orthogonal to the optical axis, and wherein at least one of the illumination device and the second holder is located in a second area where the second area is surrounded by the outline of the first holder and the first area of the lens, the attachment accessory comprising:

an elastic member configured to elastically deform with operation to remove the attachment accessory from the eyepiece portion.

26. The attachment accessory according to claim 25, wherein the elastic member is configured to contact with an edge of the eyepiece portion in a state where the attachment accessory is attached to the eyepiece portion.

27. The attachment accessory according to claim 25, wherein the attachment accessory is at least one of an eyecup, a magnifier, and an angle finder.

28. An attachment accessory detachably attachable to a viewfinder unit provided with a display unit capable of displaying an image, wherein the viewfinder unit includes:

an eyepiece portion, a lens provided between the display unit and the eyepiece portion, a first holder configured to hold the lens in a direction orthogonal to an optical axis of the lens, an illumination device configured to illuminate an eye of a photographer with a predetermined light, a sensor capable of picking up an image of the eye of the photographer, illuminated by the illumination device with the predetermined light, to detect a line of sight of the photographer, and an opening provided in the eyepiece portion, wherein the opening is wider than a display area of the display unit when viewed in an optical axis direction of the lens, wherein, when the eyepiece portion is viewed in the optical axis direction, the illumination device is located inside the opening and outside the display area of the display unit, wherein part of a first area of the lens, projecting from an outline of the first holder in the optical axis direction, is located inside the opening in the direction orthogonal to the optical axis, and wherein the illumination device overlaps part of the lens in a plane orthogonal to the optical axis, the attachment accessory comprising:

an elastic member configured to elastically deform with operation to remove the attachment accessory from the eyepiece portion.

29. The attachment accessory according to claim 28, wherein the elastic member is configured to contact with an edge of the eyepiece portion in a state where the attachment accessory is attached to the eyepiece portion.

30. The attachment accessory according to claim 28, wherein the attachment accessory is at least one of an eyecup, a magnifier, and an angle finder.

* * * * *